United States Patent
Novek

(10) Patent No.: US 11,034,619 B2
(45) Date of Patent: Jun. 15, 2021

(54) INTRINSIC CO2 CAPTURE PROCESS FOR THE PRODUCTION OF METAL OXIDES, CEMENT, CO2 AIR CAPTURE OR A COMBINATION THEREOF

(71) Applicant: Ethan J. Novek, Greenwich, CT (US)

(72) Inventor: Ethan J. Novek, Greenwich, CT (US)

(73) Assignee: Innovator Energy, LLC, Princeton, NJ (US)

( * ) Notice: Subject to any disclaimer, the term of this patent is extended or adjusted under 35 U.S.C. 154(b) by 0 days.

(21) Appl. No.: 16/944,850

(22) Filed: Jul. 31, 2020

(65) Prior Publication Data

US 2021/0061706 A1    Mar. 4, 2021

Related U.S. Application Data

(60) Provisional application No. 62/895,557, filed on Sep. 4, 2019, provisional application No. 63/042,397, filed on Jun. 22, 2020, provisional application No. 62/890,254, filed on Aug. 22, 2019.

(51) Int. Cl.
| | |
|---|---|
| *B01D 53/50* | (2006.01) |
| *C04B 7/02* | (2006.01) |
| *C04B 7/36* | (2006.01) |
| *C04B 7/42* | (2006.01) |
| *C04B 7/44* | (2006.01) |
| *C01B 32/50* | (2017.01) |

(52) U.S. Cl.
CPC .............. *C04B 7/367* (2013.01); *C01B 32/50* (2017.08); *C04B 7/02* (2013.01); *C04B 7/424* (2013.01); *C04B 7/4407* (2013.01); *C04B 7/4476* (2013.01)

(58) Field of Classification Search
None
See application file for complete search history.

(56) References Cited

U.S. PATENT DOCUMENTS

| | | | | |
|---|---|---|---|---|
| 3,989,796 | A * | 11/1976 | Morita | B01D 53/501 |
| | | | | 423/243.09 |
| 4,066,735 | A * | 1/1978 | Peniston | C01F 11/04 |
| | | | | 423/159 |
| 5,512,097 | A * | 4/1996 | Emmer | C04B 7/364 |
| | | | | 106/745 |
| 5,769,940 | A | 6/1998 | College | |
| 2016/0303502 | A1* | 10/2016 | Higgins | B01D 47/10 |

OTHER PUBLICATIONS

Attari et al., "Sampling and analysis of natural gas trace constituents." Instit. of Gas Tech., Sep. 1993.*
Cubicciotti et al., "The Thermal Composition of CaSo3 and its Enthalpy of Formation", 24(6) , J. Electrochem Soc.: Solid-State Science and Technology (Jun. 1977), pp. 933-936.
Matsuzaki et al., "The Thermal Decomposition Process of Calcium Sulfite", 51(1) Bull. of Chem Soc. of Japan (1978), pp. 121-122.

* cited by examiner

*Primary Examiner* — Daniel Berns
(74) *Attorney, Agent, or Firm* — Gregory L. Porter; Hunton Andrews Kurth LLP

(57) ABSTRACT

The present invention pertains to a process for producing captured carbon dioxide. Calcium carbonate may be reacted with sulfur dioxide to produce calcium sulfite and gaseous carbon dioxide. Calcium sulfite may be thermally decomposed to produce gaseous sulfur dioxide. The processes may be used in conjunction with combusting various fuels such as a carbonaceous fuel, or a sulfurous fuel, or a nitrogenous fuel, or a hydrogen fuel, or a combination thereof.

26 Claims, 4 Drawing Sheets

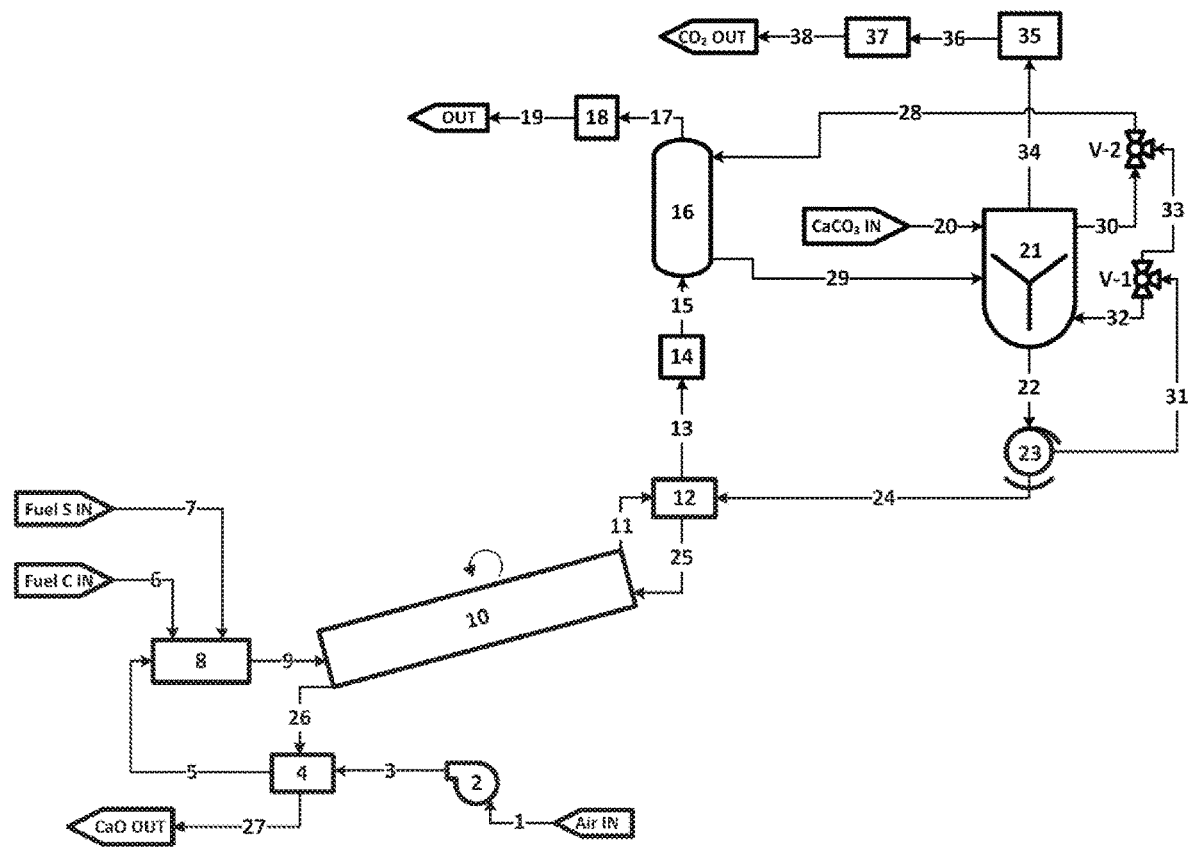
Figure 1 (above)

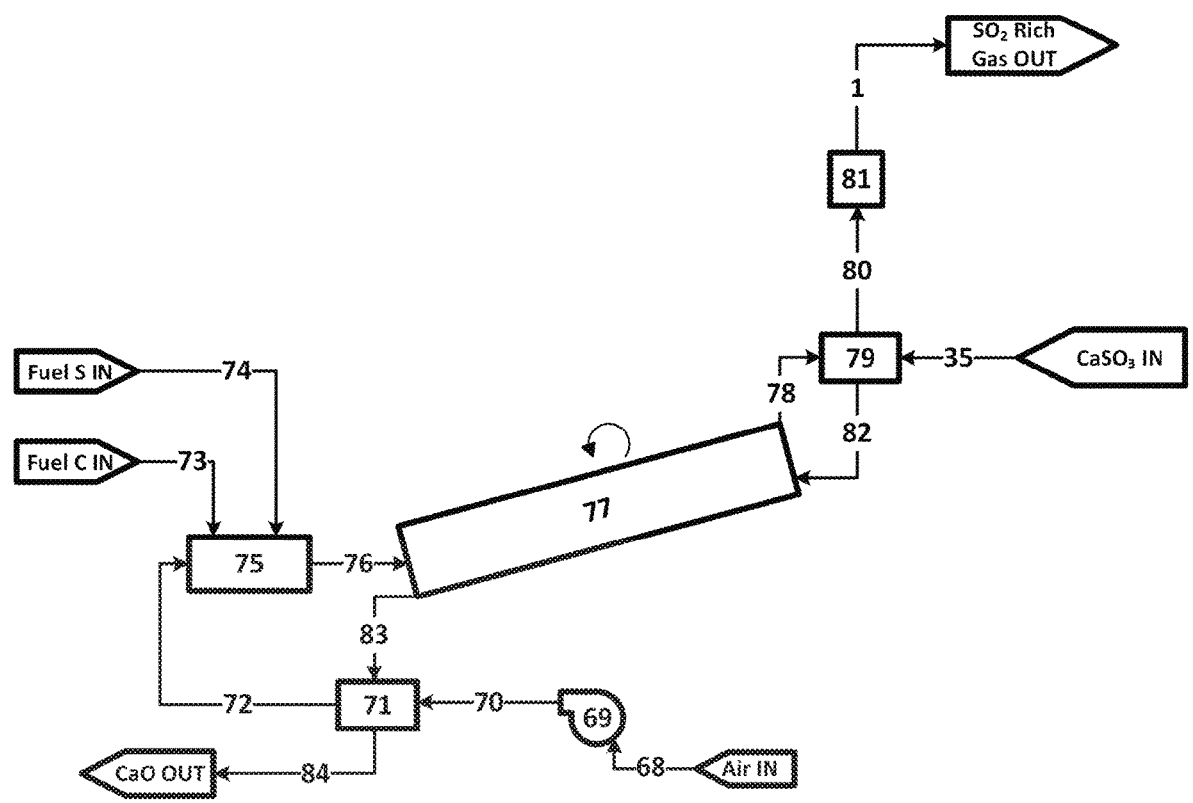
Figure 2 (above)

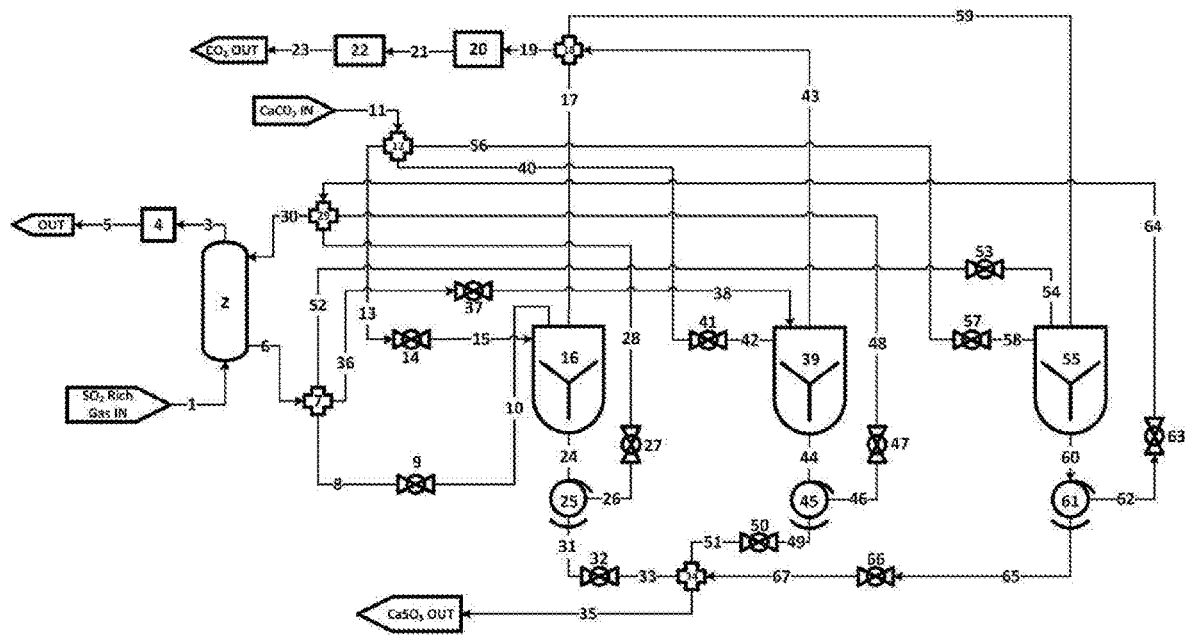
Figure 3A (above)
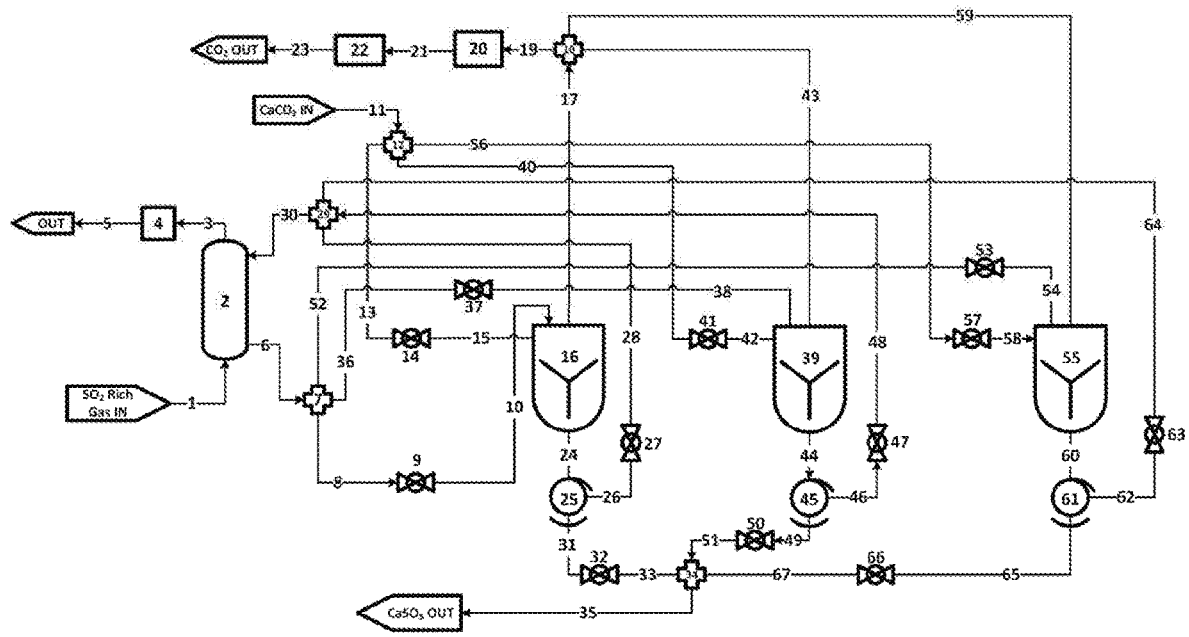
Figure 3B (above)

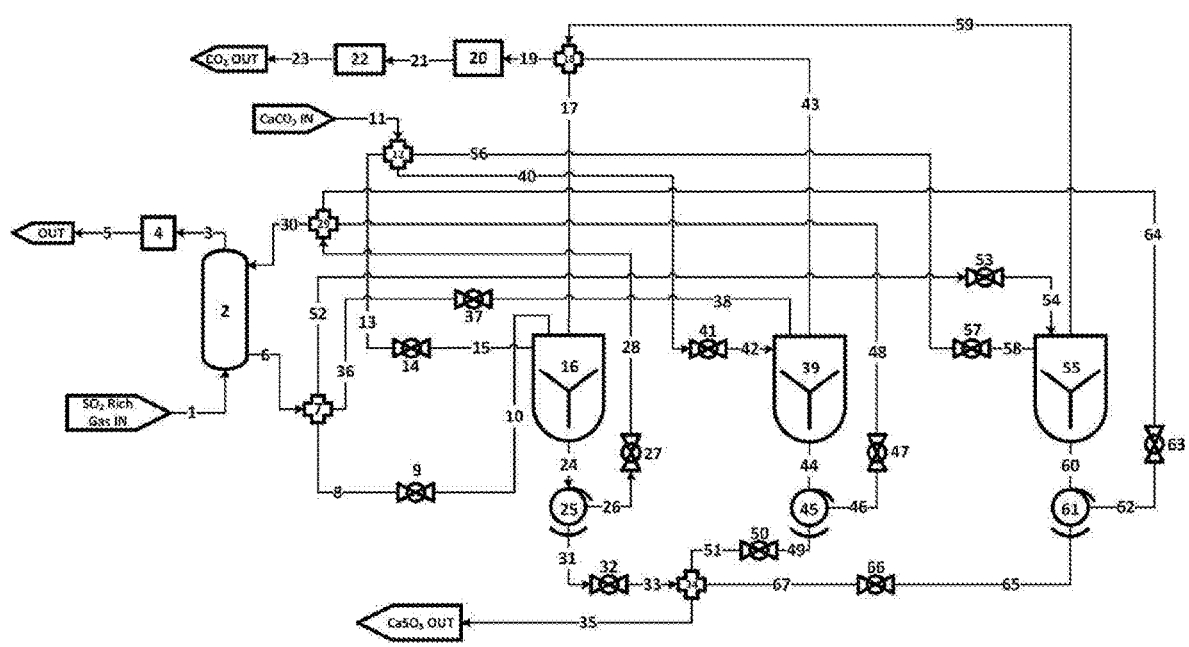
Figure 3C (above)

US 11,034,619 B2

INTRINSIC CO2 CAPTURE PROCESS FOR THE PRODUCTION OF METAL OXIDES, CEMENT, CO2 AIR CAPTURE OR A COMBINATION THEREOF

CROSS-REFERENCE TO RELATED APPLICATIONS

This application claims priority to U.S. provisional application No. 62/895,557 filed Sep. 4, 2019 and U.S. provisional application No. 63/042,397 filed Jun. 22, 2020 and U.S. provisional application No. 62/890,254 filed Aug. 22, 2019. All applications are incorporated by reference in their entirety.

BACKGROUND AND SUMMARY

CaO is currently produced by heating CaCO3 or limestone to decompose it into CaO and CO2 in a process called calcining. Calcining is energy intensive and CO2 emission intensive. The process of calcining produces CO2 in the form of flue gas. A similar process is currently used in the production of cement, such as portland cement. For CO2 to be useful from calcining, the CO2 must be separated from the flue gas by a post-combustion CO2 capture system, which requires very high capital and operating costs, which generally exceed the value of said CO2. Alternatively, a calciner may be powered by fuel combusted in pure oxygen (oxy-combustion) from an air separation unit. Oxy-combustion has high capital and operating costs due to the required air separation unit and the significantly higher operating temperature required for decomposing CaCO3 in a pure environment CO2.

The present invention may react SO2 (gas or liquid or aqueous solution or non-aqueous solution or supercritical or solid or a combination thereof) with CaCO3, which may result in the formation of CaSO3 and CO2. The resulting CO2 may undergo further purification to remove, for example, at least a portion of SO2 or any other gases present from the CO2. CO2 may be sold or used for one or more applications of high pressure and/or purity CO2. CaSO3 may be thermally decomposed into CaO and SO2. The thermal decomposition of CaSO3 may involve an oxygen free or ultra-low oxygen environment. The thermal decomposition of CaSO3 may be conducted in the presence of a combustion flue gas or a carrier gas or a combination thereof. SO2 may be separated and may be recovered or regenerated for re-use internally. Advantageously, SO2 possesses a significantly greater solubility in water and/or other physical solvents than CO2, which may enable the use of physical solvents to separate SO2 and/or may enable the use of a SO2 wash solution to react SO2 with CaCO3. CaO may be sold or used for one or more applications of CaO. The process may be batch, semi-batch, semi-continuous, continuous, or a combination thereof.

The present invention may pertain to systems, methods, and processes for producing calcium oxide or magnesium oxide or lime or sodium oxide or potassium oxide other oxide salt from a carbonate salt while intrinsically generating relatively high partial pressure CO2 and/or relatively high purity CO2. The present invention may pertain to systems, methods, and processes for producing cement from a carbonate salt while intrinsically generating relatively high partial pressure CO2 and/or relatively high purity CO2. Calcium and magnesium salts may be provided as example salts, although other cations capable of forming carbonate, bicarbonate, or oxide salts or ionic compounds are applicable to the present invention. Some embodiments may involve reacting a regenerable acid or regenerable acid gas with calcium carbonate and/or magnesium carbonate to produce an intermediate comprising calcium-acid gas and/or magnesium-acid gas and an output comprising captured CO2. Said calcium-acid gas and/or magnesium-acid gas intermediate may be converted into an intermediate comprising regenerable acid gas and an output comprising calcium oxide or magnesium oxide or cement. Some embodiments may employ a regenerable acid gas which may be regenerated using, for example, including, but not limited to, heat, electricity, light, condensation, absorption, gas-forming reaction, gas-forming decomposition, electrodialysis, or a combination thereof.

The present invention may involve employing acid gases with regeneration or recovery properties which may be more desirable or advantageous than, for example, CO2. For example, sulfur dioxide (SO2) is significantly more soluble in water than CO2 at the same vapor pressure and temperature, and/or sulfurous acid (aqueous sulfur dioxide) displaces CO2 in carbonate salts to form sulfite or bisulfite or metabisulfite salts. Sulfite or bisulfite or metabisulfite salts may possess decomposition temperatures and enthalpies of decomposition similar to carbonate salts. Said more desirable or advantageous properties may include, but are not limited to, solubility in water, solubility in one or more solvents or liquids, enthalpy of desorption, enthalpy of absorption, enthalpy of reaction, or a combination thereof. Some embodiments may involve systems and methods for preventing oxidation or degradation or contamination of the acid gas, or preventing oxidation or degradation or contamination of the calcium oxide, or preventing degradation or contamination of the carbon dioxide, or preventing degradation or contamination of a physical solvent or a combination thereof.

BRIEF DESCRIPTION OF THE FIGURES

FIG. 1 shows an embodiment of a process for continuous production of CaO from CaCO3 or limestone or other typical CaO feedstocks.

FIG. 2 shows an embodiment comprising a process for producing CaO from CaSO3.

FIG. 3A shows an embodiment comprising a process for producing CaSO3 and CO2 from CaCO3 and SO2.

FIG. 3B shows an embodiment comprising a process for producing CaSO3 and CO2 from CaCO3 and SO2 with each reactor undergoing a different stage than in FIG. 3A.

FIG. 3C shows an embodiment comprising a process for producing CaSO3 and CO2 from CaCO3 and SO2 with each reactor undergoing a different stage than in FIG. 3A.

DETAILED DESCRIPTION OF THE INVENTION

Example Definitions

Regenerable Acid Gas or Regenerable Acid: A regenerable acid may comprise an acidic chemical which can form a salt and is capable of being regenerated from said salt into its original acidic chemical form. For example, a regenerable acid may comprise an acid which can be reacted to form a salt and can be regenerated from said salt by, for example, thermal decomposition of said salt, which may involve, for example, a gas forming decomposition. For example, a regenerable acid may comprise an acid which can be reacted to form a salt and can be regenerated from said salt by, for example, electrochemical means, which may include, but is not limited to, electrodialysis. A regenerable acid gas may be an acid which is generally at a gas phase when said acid is at an isolated state under certain conditions. Regenerable acid and regenerable acid gas may be used interchangeably. Example regenerable acid gases or acids may include, but are not limited to, one or more or a combination of the following: sulfur dioxide, nitrogen dioxide, nitrogen monoxide, hydrogen sulfide, silicic acids, or orthosilicic acid. Example regenerable cation-acid gas salts may include, but are not limited to, one or more or a combination of the following: sulfites, bisulfites, metabisulfites, nitrites, carbonates, silicates, calcium sulfite, magnesium sulfite, calcium bisulfite, magnesium bisulfite, calcium nitrite, magnesium nitrite, calcium nitrate, magnesium nitrate, calcium carbonate, magnesium carbonate, calcium bicarbonate, magnesium bicarbonate, calcium silicates, magnesium silicates, sodium sulfite, sodium bisulfite, sodium metabisulfite, sodium nitrate, sodium nitrite, sodium carbonate, sodium bicarbonate, sodium sequicarbonate, sodium silicates, alkaline-earth metal cation salts, alkaline-earth metal cation salts withs anions described herein, alkali metal cation salts, alkali metal cation salts with anions described herein.

CaO: CaO may comprise calcium oxide. CaO may also be provided as an example oxide salt and may represent other oxide salts, which may include, but are not limited to, oxide salts of calcium, magnesium, sodium, potassium, lithium, ammonia, iron, zinc, aluminum, copper, or a combination thereof. CaO may also represent cement, which may include, but is not limited to, one or more or a combination of the following: hydraulic cement, non-hydraulic cement, or Portland cement. CaO may comprise a CO2-lean alkaline-earth.

CaCO3: CaCO3 may comprise calcium carbonate. CaCO3 may also be provided as an example carbon dioxide salt and may represent other carbon dioxide salts, which may include, but are not limited to, carbon dioxide salts of calcium, magnesium, sodium, potassium, lithium, ammonia, amine, iron, zinc, copper, or a combination thereof. CaCO3 may comprise limestone. CaCO3 may comprise a CO2-rich alkaline-earth.

CaSO3: CaSO3 may comprise calcium sulfite. CaSO3 may also be provided as an example regenerable acid gas salt and may represent other regenerable acid gas salts, which may include, but are not limited to, carbon dioxide salts of calcium, magnesium, sodium, potassium, lithium, ammonia, amine, iron, zinc, copper, or a combination thereof.

Carbon Dioxide Salt: A salt originating from or containing or comprising carbon dioxide. A carbon dioxide salt may include, but is not limited to, carbonates, bicarbonates, carbamates, sesquicarbonates, or a combination thereof.

Intermediate: An intermediate may comprise a reagent which is internally regenerated. An intermediate may comprise a reagent which is at least a portion regenerated inside the process. An intermediate may comprise a reagent which is not a primary input or output of the process. An intermediate may comprise a catalyst. Example intermediates may include, but are not limited to, one or more or a combination of the following: a regenerable acid gas or an absorption solution.

Combustion Gases or Post-Combustion Gases: Combustion gases or post-combustion gases may comprise gases or a gas mixture forming as a result of the combustion of one or more fuels.

Fuel-Rich Mixture: A mixture of fuel and an oxidant which possess a higher ratio of fuel to oxidant relative to a fuel-lean mixture. For example, mixture of fuel and an oxidant which possesses a ratio of fuel to oxidant which is close to, or equal to, or greater than the stoichiometric ratio of fuel to oxidant for complete combustion. Oxidant may comprise diatomic oxygen, air, or other oxidant.

Fuel-Lean Mixture: A mixture of fuel and an oxidant which possess a lower ratio of fuel to oxidant relative to a fuel-lean mixture. For example, mixture of fuel and an oxidant which possesses a ratio of fuel to oxidant which is close to, or equal to, or less than the stoichiometric ratio of fuel to oxidant for complete combustion. Oxidant may comprise diatomic oxygen, air, or other oxidant.

Low Oxygen Environment or Low Oxygen Atmosphere: May comprise one or more or a combination of the following:
  Comprises a diatomic oxygen concentration less than 20 vol %, or less than 15 vol %, or less than 10 vol %, or less than 9 vol %, or less than 8 vol %, or less than 7 vol %, or less than 6 vol %, or less than 5 vol %, or less than 4 vol %, or less than 3 vol %, or less than 2 vol %, or less than 1 vol %, or less than 0.5 vol %, or less than 0.25 vol %, or less than 0.1 vol %, or less than 0.05 vol %, or less than 0.01 vol %, or less than 0.005 vol %, or less than 0.001 vol %, or less than 0.0001 vol %.
  A volume-percent concentration of gaseous diatomic oxygen less than average concentration of oxygen in air or a diatomic oxygen concentration of less than or equal to 21 vol %

Low Dissolved Oxygen Concentration:
  A dissolved oxygen concentration less than 10,000 PPM, or less than 5,000 PPM, or less than 1,000 PPM, or less than 500 PPM, or less than 250 PPM, or less than 100 PPM, or less than 50 PPM, or less than 25 PPM, or less than 10 PPM, or less than 7.5 PPM, or less than 5 PPM, or less than 2.5 PPM, or less than 1 PPM.
  Less than the saturated solubility of dissolved oxygen at the vapor pressure of diatomic oxygen in the headspace above a solution.

Carbonaceous Fuel: A fuel comprising carbon. A carbonaceous fuel may comprise a hydrocarbon, a carbon containing compound, elemental carbon, a mixture with carbon, or a combination thereof Sulfurous Fuel: A fuel comprising sulfur. A sulfurous fuel may include, but is not limited to, sulfur, elemental sulfur, hydrogen sulfide, hydrocarbons comprising sulfur, sulfur dioxide, sulfur trioxide, sulfides, salts comprising sulfur, mercaptans, organosulfur compounds, nitrogenous sulfur compound, ammonium sulfate, ammonium sulfite, ammonium sulfide, or a combination thereof.

Nitrogenous Fuel: A fuel comprising nitrogen. A nitrogenous fuel may include, but is not limited to, ammonia, amine, ammonia salts, ammonium salts, ammonium nitrate, ammonium nitrite, ammonium sulfite, ammonium sulfide, ammonium carbonate, ammonium carbamate, urea, ammonia derivatives, organic nitrogen compounds, hydrocarbons comprising nitrogen, or a combination thereof.

Hydrogen Fuel: A fuel comprising hydrogen. Hydrogen fuel may comprise diatomic hydrogen or derivatives of hydrogen.

Other Cement Feedstocks: Other cement feedstocks may comprise input materials for the production of cement other than calcium carbonate. For example, other cement feedstocks may include, but are not limited to, one or more or a combination of the following: clay, or silicon dioxide, or aluminum oxide, or iron oxide, or iron carbonate, or magnesium carbonate, or magnesium oxide, or silicates, or silicon oxides, or aluminates, or shale, or sand, or fly ash, or ash, or slag, or sulfur oxides.

Solid Material Undergoing Calcination: May comprise solid materials undergoing thermal decomposition and/or calcination. May comprise solid materials in a calciner. May comprise solid materials entering or exiting a calciner.

Calcining Products: Calcining products may comprise outputs of a calcination process. Calcining Products may refer to solid phase products exiting a calcination process, which may include, but are not limited to, alkaline-earth oxides, alkali oxides, calcium oxide, magnesium oxide, cement, or a combination thereof. Calcining products may refer to gaseous phase products exiting a calcination process, which may include, but are not limited to, sulfur dioxide, regenerable acid gas, carbon dioxide, or a combination thereof.

Thermal Decomposition: May comprise calcination reactions. May comprise an endothermic or temperature driven gas forming reaction. May comprise other calcination reactions. Other calcination reactions may include, but are not limited to, the formation of calcium silicates and/or calcium aluminates and/or sulfur based compounds.

First Combustion Step:
  A first combustion step may comprise the combustion of a fuel in a gas or oxidant or both in at least a portion of a fresh gas or a gas mixture which previously did not undergo combustion.
  May comprise combustion which decreases the gas phase diatomic oxygen concentration from 10-100 vol % to less than 20 vol %, or less than 19 vol %, or less than 18 vol %, or less than 17 vol %, or less than 16 vol %, or less than 15 vol %, or less than 14 vol %, or less than 13 vol %, or less than 12 vol %, or less than 11 vol %, or less than 10 vol %, or less than 9 vol %, or less than 8 vol %, or less than 7 vol %, or less than 6 vol %, or less than 5 vol %, or less than 4 vol %, or less than 3 vol %, or less than 2 vol %, or less than 1 vol %. Vol % of diatomic oxygen means the volume-percent concentration of diatomic oxygen in the gas phase.

Second Combustion Step:
  A second combustion step may comprise the combustion of a fuel in a gas or oxidant or both in a gas or gas mixture which previously underwent combustion.
  May comprise combustion which decreases diatomic oxygen concentration from 0.1-20 vol % to less than 20 vol %, or less than 15 vol %, or less than 10 vol %, or less than 9 vol %, or less than 8 vol %, or less than 7 vol %, or less than 6 vol %, or less than 5 vol %, or less than 4 vol %, or less than 3 vol %, or less than 2 vol %, or less than 1 vol %, or less than 0.5 vol %, or less than 0.25 vol %, or less than 0.1 vol %, or less than 0.05 vol %, or less than 0.01 vol %, or less than 0.005 vol %, or less than 0.001 vol %, or less than 0.0001 vol %.

Diatomic Oxygen-Rich Gas: A gas or gas mixture comprising a higher partial pressure or concentration or both of diatomic oxygen relative to a Diatomic Oxygen-Lean Gas. May comprise at least a portion of a gas or gas mixture which previously did not undergo combustion.

Diatomic Oxygen-Lean Gas: A gas or gas mixture comprising a higher partial pressure or concentration or both of diatomic oxygen relative to a Diatomic Oxygen-Ultra-Lean Gas. May comprise at least a portion of a gas or gas mixture which previously underwent combustion in a first combustion step.

Diatomic Oxygen-Ultra-Lean Gas: A gas or gas mixture comprising a lower partial pressure or concentration or both of diatomic oxygen relative to a Diatomic Oxygen-Lean Gas. May comprise at least a portion of a gas or gas mixture which underwent combustion in a second combustion step.

Combustion Step: A combustion step may comprise the combustion of a fuel. A combustion step may comprise the combustion of a fuel which results in a decrease in the partial pressure and/or concentration of diatomic oxygen in a gas stream. A combustion step may comprise the combustion of a fuel which results in the increase in temperature of a gas stream or is exothermic. A combustion step may comprise the combustion of a fuel until the fuel ceases to combust.

Carbon Dioxide Generation Step: A carbon dioxide generation step may comprise a reaction between a carbon dioxide salt and a regenerable acid gas, which results in the formation of carbon dioxide. Said formed carbon dioxide may be at a gaseous state.

Calcining Step: A calcining step may comprise a step involving heat input or thermal decomposition or an endothermic gas forming reaction or a temperature driven gas forming reaction or a combination thereof.

Acid Gas Recovery Step: An acid gas recovery step may comprise absorbing, separating, or capturing a regenerable acid gas.

Alkali: An alkali may comprise reagents comprising elements in the alkali metal group in the periodic table.

Alkaline-Earth: An alkaline-earth may comprise reagents comprising elements in the alkaline-earth metal group in the periodic table.

High Purity of Carbon Dioxide: A volume-percent (vol %) concentration of carbon dioxide greater than or equal to 30 vol %, or 40 vol %, or 50 vol %, or 60 vol %, or 70 vol %, or 80 vol %, or 90 vol %, or 95 vol %, or 99 vol %, or 100 vol %.

High Pressure: A partial pressure greater than or equal to 0.1 atm, or 0.5 atm, or 1 atm, or 1.5 atm, 2 atm, or 3 atm, or 4 atm, or 5 atm, or 6 atm, or 7 atm, or 8 atm, or 9 atm, or 10 atm, or 15 atm, or 20 atm.

Low Concentration of Water Vapor:
  A water vapor pressure less than or equal to 1 atm, or 0.75 atm, or 0.5 atm, or 0.25 atm, or 0.175 atm, or 0.1 atm, or 0.09 atm, or 0.08 atm, or 0.07 atm, or 0.06 atm, or 0.05 atm, or 0.04 atm, or 0.03 atm, or 0.02 atm, or 0.01 atm, or 0.005 atm.
  A water vapor vol % concentration less than or equal to 50 vol %, or 25 vol %, or 15 vol %, or 10 vol %, or 9 vol %, or 8 vol %, or 7 vol %, or 6 vol %, or 5 vol %, or 4 vol %, or 3 vol %, or 2 vol %, or 1 vol %.

Mild Temperature: A temperature less than or equal to 150° C., or 100° C., or 90° C., or 80° C., or 70° C., or 60° C., or 50° C., or 40° C., or 35° C. A temperature greater than or equal to −50° C., or −40° C., or −30° C., or −20° C., or −10° C., or 0° C.

CO2-Rich Alkaline-Earth Solid: An alkaline earth compound with a greater molar ratio of CO2 to alkaline-earth than CO2-Lean Alkaline-Earth Solid. May comprise calcium carbonate or magnesium carbonate or a combination thereof.

CO2-Lean Alkaline-Earth Solid: An alkaline earth compound with a lower molar ratio of CO2 to alkaline-earth than CO2-Lean Alkaline-Earth Solid. May comprise calcium oxide or magnesium oxide or cement or a silicate or a combination thereof.

Physical Absorbent or Physical Solvent or Solvent: A liquid or surface or a combination thereof wherein regenerable acid gas is soluble. A physical absorbent may comprise a non-aqueous solution. A physical absorbent may comprise water. A physical absorbent may comprise a mixture of a non-water reagent with water. A physical absorbent may comprise an aqueous solution.

Physical Absorbent Wash or Physical Solvent Wash or Solvent Wash: An absorption column or wash or contactor or scrubber or a gas-liquid contactor which employs physical absorbent as an absorption solution.

Middle Concentration: A concentration greater than a lean concentration and less than a rich concentration.

Example Chemistry

| Example Summary of Inputs and Outputs for the Present Invention | |
|---|---|
| Inputs | Outputs |
| CaCO₃ and/or Other Cement Feedstocks | CaO and/or Cement |
| Fuel (Carbonaceous Fuel and/or Sulfurous Fuel and/or Hydrogen Fuel and/or Nitrogenous Fuel) | Captured CO₂ |
| | Sulfurous Salt Waste-Product or Useful Byproduct |

Please note—the Sulfurous Fuel and Sulfurous Salt Waste-Product or Useful Byproduct may comprise significantly smaller mass or amounts than other inputs and outputs.

Reaction 1: Conversion of CaCO3 and SO2 or SO2 Solution into CaSO3 and Captured CO2

CaCO₃(s)+SO₂(rich-aq)⇒CaSO₃(s)+SO₂(lean-aq)+ CO₂(g)

ΔH=−24.67 kJ/mol at 25° C.

Description: The present reaction may involve reacting a carbon dioxide containing salt or carbonate salt, such as calcium carbonate, with a regenerable acid gas, such as sulfur dioxide, to form pressurized or high concentration or nearly pure CO2 and a regenerable acid gas salt, such as calcium sulfite. If desired, the present reaction may be conducted under mild temperature conditions, which may include, but are not limited to, room temperature, 0-100° C., or less than 200° C., or less than 190° C., or less than 180° C., or less than 170° C., or less than 160° C., or less than 150° C., less than 140° C., less than 130° C., or less than 120° C., less than 110° C., or less than 100° C., or less than 90° C., or less than 80° C., or less than 70° C., or less than 60° C., or less than 50° C., or less than 40° C., or less than 30° C. Alternatively, or additionally, it may be desirable to conduct the present step at relatively colder temperatures, to, for example, minimize the vapor pressure or concentration of SO2 in the headspace or gas phase. Relatively colder temperatures may include, but are not limited to, less than 50° C., or less than 45° C., or less than 40° C., or less than 35° C., or less than 30° C., or less than 25° C., less than 20° C., or less than 15° C., or less than 10° C., or less than 5° C. The CO2 generated may comprise substantially lower concentrations of water vapor and/or other contaminants relative to desorbed carbon dioxide in some post-combustion CO2 capture systems, which may enable less or lower cost post-treatment and/or compression. The CO2 generated may be present at relatively high pressures, which may enable lower compression costs and/or lower compression energy demand if subsequent compression is desired. It may be desirable for the present reaction to be conducted in a low diatomic oxygen or diatomic oxygen free environment to, for example, prevent the formation of more permanent sulfur oxides, such as sulfates and/or sulfur trioxide. The present reaction may occur at a yield of 100% or may occur at a yield less than 100%. If the yield of the present reaction is less than 100%, a portion of calcium carbonate may be present in the solid reaction product. The sulfur dioxide may be dissolved in water. The sulfur dioxide may be dissolved in a solution comprising a physical absorbent. Said physical absorbent may comprise a one or more or a combination of reagents in which sulfur dioxide and/or other acid gases is soluble.

Conditions: It may be desirable to mix the input reagents under standard conditions, which may include, but are not limited to, room temperature pressure conditions. Alternatively, or additionally, reagents may be mixed under high pressure conditions to enable a higher partial pressure of CO2 during desorption and/or a lower vol % concentration of water vapor and/or SO2 relative to CO2 in the reactor headspace or atmosphere. It may be desirable to conduct the present reaction under a pure or nearly pure or high concentration CO2 atmosphere to, for example, enable the process to generate high quality or high concentration or high purity or a combination thereof captured CO2 and/or to minimize the need for additional treatment or compression during or after CO2 generation. Note that during the present reaction, temperatures and pressures may increase or decrease or a combination thereof. Reaction 1 may be exothermic and may be a gas forming reaction—temperatures and/or pressures may increase during Reaction 1. It may be desirable to facilitate an increase in temperatures and/or pressures, or it may be desirable to relieve an increase in temperatures and/or pressures.

Proof: 6 wt % aqueous SO2 (sulfurous acid purchased from Sigma Aldrich) was diluted to 0.3 wt % aqueous SO2 with DI water. The 0.3 wt % aqueous SO2 was mixed with 98% purity CaCO3(s) (purchased from Sigma Aldrich) at room temperature and pressure. 0.3 wt % aqueous SO2 is within or less than the likely concentration range of SO2 in the SO2-Rich solution based on SO2 solubility in water according to Henry's Law. Greater concentrations than 0.3 wt % SO2(aq) are possible and 0.3 wt % was tested as a conservative example. A gas forming reaction occurred. Using FTIR, the resulting gas phase was determined to comprise CO2. Using FTIR, the resulting solid phase was determined to comprise CaSO3.

Reaction 2: Calcination or Thermal Decomposition of CaSO3 into CaO and SO2

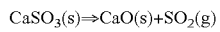

$\Delta H$=+226.3 kJ/mol

Reaction occurs at or above 780° C.

Description: Reaction 2 involves producing CaO and regenerating the acid gas. Reaction 2 may involve the thermal decomposition of calcium sulfite into calcium oxide and sulfur dioxide. Reaction 2 may be conducted in the presence of other cement feedstocks. Reaction 2 may produce cement as an output instead of, or in addition to, calcium oxide. For example, the present reaction may be conducted in the presence of other cement feedstocks to produce cement or Portland cement. The present reaction may be conducted in a kiln or other system employed for calcination. The present reaction may be retrofitted into or conducted in infrastructure designed for the calcination of cement or calcium carbonate or limestone or a combination thereof. The present reaction may be facilitated by a carrier gas, which may comprise hot combustion gases or a hot recirculated carrier gas or a combination thereof.

Note: A portion of sulfur dioxide or other sulfur compounds may be absorbed or reacted into the solid material undergoing calcination and/or may be present in the calcined products or at least a portion of the calcined products.

Note: Sulfur dioxide may be absorbed into other cement feedstocks and/or the calcined products if, for example, the present reaction is employed for the production of cement. Sulfur dioxide exiting the calciner as gaseous sulfur dioxide may comprise less sulfur dioxide than the amount of sulfur dioxide in the form of 'sulfite' present in the calcium sulfite input.

Conditions: The present thermal decomposition reaction may be conducted at elevated temperatures, which may include, but is not limited to, temperatures greater than 700° C., or greater than 720° C., or greater than 750° C., or greater than 780° C. The temperature range of the present reaction may be similar to the temperature range employed in the calcination of calcium carbonate. Heat may be supplied to power the thermal decomposition process, by, for example, including, but not limited to, hot combustion flue gases or hot carrier gases or a combination thereof, which may be passed over or through or in direct contact with the calcium sulfite. It may be desirable for the present reaction to be conducted in a low diatomic oxygen or diatomic oxygen free environment to, for example, prevent the formation of relatively permanent sulfur oxides, such as sulfates and/or sulfur trioxide. For example, said hot combustion flue gases may possess low concentrations of diatomic oxygen or may be diatomic oxygen free. If the reaction yield in 'Reaction 1' is less than 100%, there may be calcium carbonate present in the input calcium sulfite. Some calcination conditions of the calcium sulfite may be similar and/or applicable to the calcination conditions employed for calcium carbonate, enabling residual calcium carbonate to be thermally decomposed into calcium oxide and/or cement simultaneously to the thermal decomposition of calcium sulfite into calcium oxide during 'Reaction 2'.

The present reaction step may be conducted in the presence of clay, silicates or other reagents or materials present in a cement kiln during the production of cement, or a combination thereof. For example, calcium sulfite may be employed as a substitute for a portion of the calcium carbonate or calcium oxide or a combination thereof employed as an input feedstock during the production of cement. The resulting cement may comprise the same or similar composition or properties to Portland cement or other cements known in the art. The resulting cement may comprise the same or similar or superior properties to cements known in the art.

The present invention and/or the present reaction step may comprise a process for the production of cement. Said cement may comprise Portland cement. Said cement may comprise calcium oxide or other oxide salt, which may be carbonated or hydrated or otherwise reacted in a manner during the curing of said cement or plaster.

Proof: The thermal decomposition temperature and enthalpy of formation of calcium sulfite are documented in literature. Cubicciotti et al. (Cubicciotti, D., Sanjurjo, A., & Hildenbrand, D. L. (1977). The thermal decomposition of CaSO3 and its enthalpy of formation. *Journal of The Electrochemical Society*, 124(6), 933) determined the decomposition temperature of calcium sulfite is 723° C. to 767° C. and its enthalpy of formation is −277 Kcal per mole, or −1159 kJ per mole. Matsuzaki et al. (Matsuzaki, R., Masumizu, H., Murakami, N., & Saeki, Y. (1978). The Thermal Decomposition Process of Calcium Sulfite. *Bulletin of the Chemical Society of Japan*, 51(1), 121-122. doi:10.1246/bcsj.51.121) found calcium sulfite starts decomposing at 640° C. and fully decomposes into calcium oxide and sulfur dioxide above 780° C.

Reaction 3: Absorption of SO2 into SO2-Lean Solution, Recovering SO2

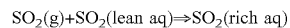

$\Delta H$=−23.2 kJ/mol

Absorption may occur at, for example, room temperature conditions or relatively cool conditions Description: Reaction 3 involves absorbing acid gas or separating acid gas from a gas mixture or a combination thereof. Reaction 3 may involve absorbing sulfur dioxide into an aqueous solution, separating at least a portion of the sulfur dioxide from a gas mixture, which may comprise post-combustion gases or flue gases. The resulting sulfur dioxide rich aqueous solution may comprise a suitable form of sulfur dioxide to employed in Reaction 1. At least a portion or all of the sulfur dioxide absorbed in Reaction 3 may be employed in Reaction 1. Sulfur dioxide may be reused internally, as may, for example, be expressed in Reactions 1-3. SO2(aq) from Reaction 3 may comprise the same SO2(aq) as is an input to Reaction 1.

The present reaction and/or the entire process may benefit or harness the greater solubility of SO2(aq) in water relative to carbon dioxide and/or the ability for SO2 to be continuously recirculated in the system. Unlike carbon dioxide, at gas partial pressures less than 1 atm and temperatures above 0° C., sulfur dioxide is soluble in water and may form a solution with a substantial concentration of dissolved SO2 (e.g. greater than 0.01 wt %). For example, 10 vol % SO2 in a gas stream with a total pressure of 1 atm can dissolve in water to form a solution with 0.826 wt % SO2 at 25° C. (according to Henry's Law), while a 10 vol % CO2 in a gas stream with a total pressure of 1 atm can dissolve in water to form a solution with 0.014 wt % CO2 at 25° C. Based on Henry's Law, SO2 possesses about 59 times or 5,900% greater solubility in water than CO2. The significantly greater solubility of SO2 relative to CO2 may be leveraged in the present process to produce captured CO2 and/or valuable oxide salts and/or valuable other salts by, for example, including, but not limited to, the ability to separate SO2(g) from gas streams with relatively low partial pressures of SO2(g) through dissolution in water and/or the react the resulting SO2(aq) directly with a CO2-containing salt to produce high partial pressure CO2(g) and a thermally decomposable SO2-containing salt. Advantageously, SO2 can be regenerated from the SO2-containing salt (such as Reactions 2 and 3) while producing a desired product oxide salt (Reaction 2).

Conditions: The present reaction or step may be conducted under conditions suitable or advantageous to enable the dissolution or absorption of an acid gas, such as SO2, into water or aqueous solution. For example, the present reaction may be conducted near or at or above atmospheric pressure and/or near or at or below atmospheric temperature. For example, the present reaction may conducted under conditions which may provide an desired or optimal balance between absorption rate and absorption capacity. For example, the present reaction may conducted under conditions which may provide greater absorption capacity, such as lower temperatures and/or greater pressures. For example, the present reaction may conducted under conditions which may provide greater absorption rate, such as higher temperatures and/or greater pressures. For example, the present reaction may conducted under conditions which are sufficiently cool to enable absorption capacity, such as, including, but is not limited to, one or more or a combination of the following temperature ranges: less than 100° C., or less than 90° C., or less than 80° C., or less than 70° C., or less than 60° C., or less than 50° C., or less than 40° C., or less than 30° C., or less than 25° C., or less than 20° C., or less than 15° C., or less than 10° C., or less than 5° C., or less than 0° C. For example, the present reaction may conducted under conditions which are sufficiently warm to prevent the formation of a solid phase, such as ice, which may include, but is not limited to, one or more or a combination of the following: greater than –15° C., greater than –10° C., greater than –5° C., or greater than 0° C. For example, the present reaction may be conducted with partial pressures or volume % concentrations or combinations thereof of acid gas which are sufficient to enable a sufficiently concentrated acid gas solution, which may include, but is not limited to, one or more or a combination of the following: greater than 10 PPM, or greater than 100 PPM, or greater than 1000 PPM, or greater than 0.1%, or greater than 0.5%, or greater than 1%, or greater than 2%, or greater than 3%, or greater than 4%, or greater than 5%, or greater than 6%, or greater than 7%, or greater than 8%, or greater than 9%, or greater than 10%.

Proof: According to Henry's Law, a 10 vol % SO2 in a gas stream with a total pressure of 1 atm can dissolve in water to form a solution with 0.826 wt % SO2(aq) at 25° C. 0.826 wt % SO2(aq) is a greater concentration than the weight-percent concentration of SO2(aq) in the experimental proof for Reaction 1.

Note: A sufficiently concentrated acid gas solution may comprise a solution with a concentration of dissolved acid gas comprising greater than or equal to one or more or a combination of the following concentrations: 0.0001 wt %, or 0.001 wt %, or 0.01 wt %, or 0.05 wt %, or 0.1 wt %, or 0.2 wt %, or 0.3 wt %, or 0.4 wt %, or 0.5 wt %, or 0.6 wt %, or 0.7 wt %, or 0.8 wt %, or 0.9 wt %, or 1 wt %, or 1.1 wt %, or 1.2 wt %, or 1.3 wt %, or 1.4 wt %, or 1.5 wt %, or 1.6 wt %, or 1.7 wt %, or 1.8 wt %, 1.9 wt %, or 2.0 wt %, or 2.5 wt %, or 3 wt %, or 3.5 wt %, or 4 wt %, or 4.5 wt %, or 5 wt %.

Note: During or before or after one or more or a combination of the above reactions, a portion of the sulfur oxides may be exposed to oxygen and may form a portion of more permanent oxides, such as sulfates or sulfur trioxide. Said exposure to diatomic oxygen may be inadvertent or incidental or unintentional or accidental. The presence of more permanent sulfur oxides may have a minimal impact or may be beneficial to the output calcium oxide or cement, especially if said more permanent sulfur oxides exist at a relatively low concentration. A relatively low concentration may include, but is not limited to, one or more or a combination of the following: less than 1 wt %, or less than 2 wt %, or less than 3 wt %, or less than 4 wt %, or less than 5 wt %, or less than 6 wt %, or less than 7 wt %, or less than 8 wt %, or less than 9 wt %, or less than 10 wt %, or less than 15 wt %, or less than 20 wt %, or less than 30 wt %, or less than 40 wt %, less than 50 wt %.

| Heat Input Requirements | |
| --- | --- |
| Reactions Requiring Heat | Heat Input Required |
| $CaSO3(s) \Rightarrow$ $CaO(s) + SO_2(g)$ | $\Delta H = +226.3 \frac{kJ}{mol}$ |
| | or |
| | 4,035.5 MJ per Metric Ton of CaO |
| Total | 4,035.5 MJ per Metric Ton of CaO |

| Comparison of Heat Input Required | | |
| --- | --- | --- |
| Reaction (Representative of Type of Process) | $CaSO_3(s) \Rightarrow CaO(s) + SO_2(g)$ | $CaCO_3(s) \Rightarrow CaO(s) + CO_2(g)$ |
| Heat Input Temperature | >780° C. | >900° C. |
| Heat Input Required | $\Delta H = +226.3 \frac{kJ}{mol}$ | $\Delta H = +172 \frac{kJ}{mol}$ |
| | or | or |
| | 4,035.5 MJ per Metric Ton CaO | 3,067.2 MJ per Metric Ton CaO |

| CO2 Emissions Comparison of $CO_2$ Emissions by Reaction | | |
| --- | --- | --- |
| Reaction (Representative of Type of Process) | $CaSO_3(s) \Rightarrow CaO(s) + SO_2(g)$ | $CaCO_3(s) \Rightarrow CaO(s) + CO_2(g)$ |
| Heat Input Temperature | >780° C. | >900° C. |
| Heat Input Required | $\Delta H = +226.3 \frac{kJ}{mol}$ | $\Delta H = +172 \frac{kJ}{mol}$ |
| | or | or |
| | 4,035.5 MJ per Metric Ton CaO | 3,067.2 MJ per Metric Ton CaO |
| $CO_2$ Emissions from Heat (if Fuel is Natural Gas) | 0.199 Metric Ton $CO_2$ per Metric Ton CaO | 0.151 Metric Ton $CO_2$ per Metric Ton CaO |
| $CO_2$ Emissions from Heat (if Fuel is Coal) | 0.618 Metric Ton $CO_2$ per Metric Ton CaO | 0.470 Metric Ton $CO_2$ per Metric Ton CaO |
| $CO_2$ Emissions from Heat (if Fuel is Carbon-Free) | 0 Metric Ton $CO_2$ per Metric Ton CaO | 0 Metric Ton $CO_2$ per Metric Ton CaO |

-continued

| | CO2 Emissions Comparison of CO$_2$ Emissions by Reaction | |
|---|---|---|
| CO$_2$ Emissions from Thermal Decomposition Reaction | 0 Metric Tons CO$_2$ per Metric Ton CaO | 0.784 Metric Ton CO$_2$ per Metric Ton CaO |
| Total CO$_2$ Emissions (if Natural Gas is Fuel) | 0.199 Metric Ton CO$_2$ per Metric Ton CaO | 0.935 Metric Ton CO$_2$ per Metric Ton CaO |
| Total CO$_2$ Emissions (if Coal is Fuel) | 0.618 Metric Ton CO$_2$ per Metric Ton CaO | 1.254 Metric Ton CO$_2$ per Metric Ton CaO |
| Total CO$_2$ Emissions (if Fuel is Carbon-Free) | 0 Metric Ton CO$_2$ per Metric Ton CaO | 0.784 Metric Ton CO$_2$ per Metric Ton CaO |

Note: CO2 emissions may be net negative if the full lifecycle, including the absorption of CO2 from the air during downstream uses of CaO, such as in cement, non-hydraulic cement, plaster, or quicklime.

Note: CO2 emissions from the production of CaSO3 may be net zero because, for example, the CO2 generated from the reaction converting CaCO3 to CaSO3 is high purity, captured CO2, which may be directly employed in utilization, conversion, and/or sequestration.

| | Cost of Inputs, Value of Outputs, and Operating Profit Cost of Inputs, Value of Outputs, and Operating Profit | |
|---|---|---|
| Reaction (Representative of Type of Process) | CaSO$_3$(s) ⇒ CaO(s) + SO$_2$(g) | CaCO$_3$(s) ⇒ CaO(s) + CO$_2$(g) |
| Inputs and Cost of Inputs | 1.783 Metric Tons of CaCO$_3$ = $89.15 0.199 Metric Tons of Nat. Gas = $10.38 | 1.783 Metric Tons of CaCO$_3$ = $89.15 0.151 Metric Tons of Nat. Gas = $7.87 |
| Total Cost (Inputs) | $99.53 per metric ton of CaO Produced | $97.02 per metric ton of CaO Produced |
| Outputs and Value of Outputs | 1 Metric Tons of CaO = $117.80 0.784 Metric Tons of Pure CO$_2$ = $27.21 (without 45Q) 0.784 Metric Tons of Pure CO$_2$ = $54.42 (with 45Q) | 1 Metric Tons of CaO = $117.80 0.784 Metric Tons CO$_2$ Flue Gas = $0 |
| Total Value (Outputs) | $145.02 (without 45Q) per metric ton of CaO Produced $172.23 (with 45Q) per metric ton of CaO Produced | $117.80 per metric ton of CaO Produced |
| Net Profit | $45.49 (without 45Q) per metric ton of CaO Produced $72.70 (with 45Q) | $20.78 per metric ton of CaO Produced | per metric ton of CaO Produced

EXAMPLE FIGURE DESCRIPTIONS

FIG. 1: Embodiment of a process for continuous production of CaO from CaCO3 or limestone or other typical CaO feedstocks. SO2 is provided as an example regenerable acid gas.

FIG. 2: Embodiment comprising a process for producing CaO from CaSO3. The present embodiment may comprise a portion of an overall process for the production of CaO from CaCO3 or limestone or other typical CaO feedstocks. For example, the present embodiment may comprise a portion of an overall process for the production of CaO wherein other portions of the process may comprise a batch or semi-batch or continuously stirred reactor (CSTR) or continuous process or a combination thereof, such as embodiments shown in FIGS. 3A-3C.

FIG. 3A: Embodiment comprising a process for producing CaSO3 and CO2 from CaCO3 and SO2. For example, the present embodiment may comprise a portion of an overall process for the production of CaO from CaCO3 and may comprise the present figure combined with FIG. 2. The present figure may comprise a batch or semi-batch or semi-continuous configuration. The present figure may show the present embodiment in a stage of a sequence of stages.

For example, the stages in a sequence may comprise:
1. First Stage: CaCO3 may be added to the first reactor ('16')
2. Second Stage: H2SO3 or SO2(aq) or dissolved SO2 or liquid SO2 or gaseous SO2 or SO2 or a combination thereof may be added to the second reactor ('39') which may result in the production of CO2 and the formation of CaSO3(s)
3. Third Stage: CaSO3(s) and remaining water or remaining solution may be drained or removed from the third reactor ('55'). The CaSO3(s) may be separated ('61') from the remaining water or solution.

FIG. 3B: Same embodiment as FIG. 3A. The present figure shows each reactor undergoing a different stage than in FIG. 3A. In the present embodiment, the sequence of stages may comprise multiple stages. For example, the present embodiment may involve the sequence of stages described in the figure description of FIG. 3A.

FIG. 3C: Same embodiment as FIG. 3A. The present figure shows each reactor undergoing a different stage than in FIG. 3A. In the present embodiment, the sequence of stages may comprise multiple stages. For example, the present embodiment may involve the sequence of stages described in the figure description of FIG. 3A.

EXAMPLE FIGURE KEYS

| Example FIG. 1 Key | |
|---|---|
| # | Process Element Descriptions |
| 1 | Air Input - Air or other gas comprising at least a portion oxygen. |
| 2 | Gas Blower or Air Blower or Other Air Pump - Pump or Fan or Blower to pressurize or transfer or a combination thereof air or other gas comprising at least a portion oxygen into the system. |
| 3 | Air Post '2' - Air or other gas comprising at least a portion oxygen after the gas blower. The temperature of '3' may be similar to the temperature of the air source or |

-continued

Example FIG. 1 Key

| # | Process Element Descriptions |
|---|---|
| | the surrounding outside air temperature. The temperature of '3' may be less than the temperature in '5'. |
| 4 | Heat Exchanger or Contact Heat Exchanger or Lime Cooler - '3', which may comprise air, may be heat exchanged with hot CaO ('26'), which may result in pre-heated air and cooled CaO. '3' may be directly contacted with the CaO, cooling the CaO, while heating the air. If the air or other oxygen containing gas is in direct contact with CaO, it may be desirable to prevent the air or other oxygen containing gas from entering '10' or other environment potentially containing sulfur oxides or recoverable sulfur oxides to prevent, for example, oxidation of $SO_2$ and/or sulfite into $SO_3$ and/or sulfate. Alternatively, or additionally, '3' may be indirectly contacted or heat exchanged with the CaO, cooling the CaO, while heating the air. |
| 5 | Pre-Heated Air - Air which may have been preheated by in '4'. '5' may comprise the air fed into the combustion or fuel burning process. |
| 6 | Carbonaceous Fuel Input - A fuel comprising carbon ('6') may be fed or injected into a fuel firing or combustion step ('8'). Carbonaceous fuel may include, but is not limited to, natural gas, coal, pulverized coal, biomass, charcoal, oil, diesel, gasoline, kerosene, LPG, ethane, propane, butane, or a combination thereof. In some embodiments, it may be desirable to burn the carbonaceous fuel ('6') and/or sulfurous fuel ('7') at a ratio with oxygen such that minimal non-reacted oxygen or diatomic oxygen is present in post combustion gases (post-combustion gases may include, but are not limited to, '9'). |
| 7 | Sulfurous Fuel Input - A fuel comprising sulfur ('7') may be fed or injected into a fuel firing or combustion step ('8'). Sulfurous fuel may include, but is not limited to, sulfur, elemental sulfur, sour gas, hydrogen sulfide, sulfur dioxide, sulfur monoxide, ammonium sulfate, ammonium sulfite, or a combination thereof. In some embodiments, it may be desirable to burn the sulfurous fuel ('7') and/or carbonaceous ('6') at a ratio with oxygen such that minimal non-reacted oxygen or diatomic oxygen is present in post combustion gases (for example - '9'). Sulfurous fuel may be employed to reduce the concentration of oxygen in the combustion gases. Sulfurous fuel may be employed to reduce the concentration of oxygen in the combustion gases instead of rich carbonaceous fuel - air ratios, preventing or minimizing incomplete combustion and/or the formation of carbon monoxide. Sulfurous fuel may be employed to as a make-up for any sulfur dioxide losses. Alternatively, or additionally, a nitrogenous fuel, such as ammonia or an ammonia salt or an ammonia derivative, may be employed introduced or combusted in '7'. |
| 8 | Combustion chamber or Firing Fan - A chamber or step for combusting fuel to generate high temperature gases for the calcination or thermal decomposition process. '8' may be designed or optimized to minimize the concentration of oxygen in the combustion gases exiting '8' and/or maximize combustion efficiency. |
| 9 | Input Hot Combustion Gases, $SO_2$-Lean - '9' may comprise the hot combustion gases exiting '8' and entering the calcination step or kiln or rotating kiln '10'. Although '9' may contain sulfurous gases, such as sulfur dioxide, the concentration of the sulfurous gases in '9' may desirably be lower than the concentration of sulfurous gases in the gases exiting the kiln, '11'. '9' may possess minimal or ultra-low concentrations of diatomic oxygen to prevent or minimize the formation of sulfates and other practically permanent sulfur compounds or salts or further oxidized sulfur compounds. |
| 10 | Calcination Step or Kiln or Rotating Kiln - '10' may comprise a kiln for the thermal decomposition of acid gas salts into 'acid-gas' and oxide salt. For example, '10' may comprise a kiln for the thermal decomposition of calcium sulfite into sulfur dioxide and calcium oxide. '10' may comprise a rotating kiln or other kiln. Applicable kilns may include, but are not limited to, kilns employed in the art for the calcination of limestone, or calcination of calcium carbonate, or the production of cement, or a combination thereof. Calcium sulfite may be fed into the kiln and thermally decomposed into at least a portion of sulfur dioxide and calcium oxide using heat from, for example, hot combustion gases, '9', which may be directly passed through or over or in direct contact with said calcium sulfite. Warm calcium oxide, '26', and $SO_2$-Rich flue gases or combustion gases, '11', may comprise outputs of '10'. |
| 11 | Hot Flue Gases, $SO_2$-Rich - '11' may comprise the hot flue gases exiting the kiln, '10'. '11' may comprise a high concentration of $SO_2$ due to, for example, the thermal decomposition or calcination of calcium sulfite in the kiln, '10', and the $SO_2$ present in the Input Hot Combustion Gases, '9'. At least a portion or all of said '$SO_2$', may be recovered, recycled internally, and/or removed from the gases in '11' in subsequent steps before at least a portion of the gases in '11' exit the process. '11' may also comprise particulates which may require separation or removal from the gas stream in subsequent steps. |
| 12 | Heat Exchanger or Contact Heat Exchanger or Calcium Sulfite Pre-Heater - '11', which may comprise $SO_2$-Rich hot flue gases, may be heat exchanged with cold calcium sulfite ('24'), which may result in pre-cooled $SO_2$-Rich flue gases, '13', and pre-heated $CaSO_3$, '25'. $SO_2$-Rich hot flue gases may be directly contacted with the $CaSO_3$. The $SO_2$-Rich hot flue gases may be directly contacted with the $CaSO_3$, for example, because the $SO_2$-Rich hot flue gases may possess an ultra-low concentration of diatomic oxygen, which may prevent the $CaSO_3$ from oxidizing into a sulfate and may facilitate the heating and/or decomposition of $CaSO_3$. |

Example FIG. 1 Key

| # | Process Element Descriptions |
|---|---|
| 13 | Pre-Cooled $SO_2$-Rich Flue Gas - '13' may comprise pre-cooled $SO_2$-Rich flue gas, which may possess particulates which may need to be, at least in part, removed before the $SO_2$ absorption column, '16'. '13' may undergo additional cooling before or during '14'. An additional gas blower may be required to transfer '13', which may not be shown in a figure. |
| 14 | Particulate Remover or Baghouse or Electrostatic Precipitator, or Filter, or a combination thereof - '14' may comprise one or more or a combination of steps to remove particulate matter from '13'. |
| 15 | Pre-Cooled $SO_2$-Rich Flue Gas after Particulate Removal - '15' may comprise pre-cooled $SO_2$-Rich flue gas with at least a portion or most of the particulates removed relative to '13'. '15' may undergo additional cooling or treatment before entering the $SO_2$ absorption column or absorption step, '16'. |
| 16 | $SO_2$ Absorption Column - '16' may comprise an absorption column or contactor which facilitates the absorption of $SO_2$ from $SO_2$-Rich Flue Gas ('15') into an $SO_2$-Lean aqueous solution ('28'), forming an $SO_2$-rich aqueous solution ('29') and an $SO_2$-Lean Flue Gas Stream ('17'). It may be desirable for '16' to selectively absorb $SO_2$, while minimally absorbing $CO_2$. Water or water scrubbing may be employed to selectively absorb $SO_2$, while minimally absorbing $CO_2$ due to the significantly greater solubility of $SO_2$ in water than $CO_2$. |
| 17 | $SO_2$-Lean Flue Gas after $SO_2$ Absorption - '17' may comprise $SO_2$-Lean Flue gas following the absorption of $SO_2$ in '16'. '17' may undergo additional treatment before exiting the process, '18'. |
| 18 | $SO_2$ Scrubbing and/or Other Further Treatment - '18' may comprise an $SO_2$ scrubbing step to remove most of or practically all of the remaining or residual $SO_2$ in '17', which may result in an $SO_2$ ultra-lean flue gas stream, '19'. '18' may involve a scrubbing process which selectively absorbs dilute concentrations of $SO_2$, while minimally absorbing $CO_2$. For example, the absorption solution may comprise a bicarbonate, or carbonate, or carbamate, or combination thereof salt or a mixture of salts. For example, the absorbent and/or adsorbent may comprise one or more absorbents and/or adsorbents known in the art for removing $SO_2$ and/or other acid gases from flue gas streams or gas streams. '18' may comprise a regenerable scrubbing process, which may involve recovering or capturing $SO_2$ and/or other acid gases for recycle within the process for further use. '18' may comprise a non-regenerable scrubbing process, which may involve production and disposal of, for example, salts comprising $SO_2$. |
| 19 | $SO_2$ ultra-lean flue gas stream. '19' may be vented. '19' may undergo additional treatment. '19' may undergo, for example, flue gas $CO_2$ capture. Although flue gas $CO_2$ capture is feasible, in the present invention, the total $CO_2$ in flue gas emissions may be substantially lower than the total $CO_2$ captured in other process steps (for example, the captured $CO_2$ in '34') |
| 20 | '20' may comprise an input of a $CO_2$ containing salt or a salt comprising $CO_2$. For example, '20' may comprise calcium carbonate input. |
| 21 | '21' may comprise a reactor or mixing apparatus. '21' may be employed to react a salt comprising $CO_2$ (such as calcium carbonate) with a recoverable acid gas or a solution comprising a recoverable acid gas (such as aqueous sulfer dioxide). '21' may involve the generation of high partial pressure 'captured' carbon dioxide, which may be generated during a reaction of a salt comprising $CO_2$ (such as calcium carbonate) with a recoverable acid gas or a solution comprising a recoverable acid gas (such as aqueous sulfer dioxide). The headspace of '21' may comprise $CO_2$. It may be desirable for the headspace of '21' to contain a high concentration of $CO_2$ or comprise almost entirely $CO_2$ and/or water vapor and/or acid gas vapor pressure to, for example, minimize downstream processing of captured $CO_2$. '21' may operate in a continuous, semi-batch, or batch or combination thereof configuration. |
| 22 | '22' may comprise a mixture of acid-gas rich salt and a fluid. For example, '22' may comprise a mixture of solid calcium sulfite and water, which may comprise a solid-liquid mixture. '22' may comprise some reactions which have not reached full yield or may be designed to be in excess or stoichiometric excess. For example, '22' may comprise calcium carbonate and/or sulfur dioxide and/or aqueous sulfur dioxide. |
| 23 | '23' may comprise a fluid-solid separation device. For example, '23' may comprise a liquid-solid separation device or a gas-solid separation device or a liquid-gas separation device or a combination thereof. For example, '23' may comprise, including, but not limited to, one or more or a combination of the following: a filter, a rotary filter, a centrifuge, a decanter, or a sedimentation separator. '23'may involve separating solid salts, such as calcium sulfite and calcium carbonate, from water or remaining aqueous acid gas solution or acid gas or a combination thereof. |
| 24 | '24' may comprise separated solid. '24' may comprise separated calcium sulfite or calcium carbonate or a combination thereof. '24' may be transferred to one or more steps involving pre-treatment, pre-heating, or calcination or thermal decomposition. For example, '24' may undergo drying or further drying before or during or after entering '12'. It may be desirable for said drying, if any, to involve minimal or no contact with diatomic oxygen to, for example, prevent the oxidation of sulfite to sulfate. For example, said drying may comprise, including, but not limited to, one or more or a combination of the following: desiccants, or dry carrier gas, or warm carrier gas, or heated carrier gas, or centrifugation, or heating. |

Example FIG. 1 Key

| # | Process Element Descriptions |
|---|---|
| 25 | '25' may comprise pre-heated solid salt, which may comprise at least a portion a salt comprising acid gas. For example, '25' may comprise a pre-heated solid comprising calcium sulfite. '25' may comprise pre-heated solid undergoing transferring to a calcination or thermal decomposition or cement production reaction or oxide salt formation reaction or gas formation reaction or a combination thereof step. |
| 26 | '26' may comprise a calcined product. For example, '26' may comprise calcium oxide, or Portland cement, or cement, or magnesium oxide or a combination thereof. '26' may be warm due to exiting a thermal decomposition or calcination process. '26' may be lean or contain a substantially lower concentration of sulfur dioxide or acid gas or recoverable acid or carbon dioxide or a combination thereof than '25'. '26' may contain residual sulfite or sulfate or other sulfur or acid gas or may contain residual carbon dioxide salts or a combination thereof. |
| 27 | '27' may comprise cooled calcined product. '27' may exit the process and may be sold or otherwise utilized. '27' may undergo further treatment if desired. |
| 28 | '28' may comprise acid gas lean or sulfur dioxide lean water or solution. '28' may be transferred to '16' for absorption or bulk absorption of acid gas or sulfur dioxide. '28' may be cooled before being contacted with acid gases or before entering '16'. Said cooling may involve recovering heat from '28', which may include, but is not limited to, process heating, space heating, or other applications for heat. Said cooling may involve a chiller or chilled water or air cooling or wet surface contact cooling or other cooling methods or a combination thereof or one or more or a combination of processes for cooling. |
| 29 | '29' may comprise an acid gas rich or sulfur dioxide rich water or solution. '29' may comprise a sulfur dioxide rich solution resulting from the absorption of sulfur dioxide into water in an absorption column or gas-liquid contactor. '29' may comprise an acid gas rich solution. |
| 30 | '30' may comprise sulfur dioxide lean or other acid gas lean solution. '30' may be lean in sulfur dioxide due to the reaction of aqueous sulfur dioxide with calcium carbonate. If present embodiment is operating in a continuous or semi-continuous fashion, '30' may be lean in sulfur dioxide due to originating from or being transferred from a section or portion of '21' which may possess solution with the greatest or a greater average contact time with calcium carbonate or other salt comprising carbon dioxide. |
| 31 | '31' may comprise a solution or liquid phase separated following a solid-liquid separation step (for example: '23'). '31' may comprise a lean concentration of acid gas or dissolved $SO_2$. '31' may comprise a middle concentration of acid gas or dissolved $SO_2$. '31' may be recirculated ('32') into a reactor or mixer and/or may be employed as a solution ('33') transferred or mixed with a solution to be employed as an absorption solution. The proportion of '31' recirculated relative to employed as an absorption solution may be dependent on the relative concentration of dissolved acid gas in '31', which may be monitored or measured with, for example, one or more or a combination of monitoring or measuring devices. |
| 32 | '32' may comprise '31' undergoing recirculation to a reactor or mixing vessel. |
| 33 | '33' may comprise '31' being transferred as a portion of an absorption solution. It may be desirable to mix '33' with '30'. Alternatively, or additionally, '33' may be transferred directly an absorption column ('16'), wherein '33' may enter or may be fed into the absorption column at a different point than '30' or '28'. For example, if '33' possesses a greater concentration of acid gas or $SO_2$ than '28' or '30', it may be desirable to add '33' to an absorption column at a lower height or lower point in the absorption column. For example, it may be desirable to add '33' at a point in the absorption column where the concentration of dissolved acid gas in the absorption solution may be similar to the concentration of dissolved acid gas in '33'. |
| 34 | '34' may comprise a gas stream exiting a reactor or mixer, '21'. '34' may comprise relatively high-pressure $CO_2$ or a gas stream comprising $CO_2$. If desirable, '34' may exit '21' at a relatively standard temperature and with a relatively low partial pressure of water vapor and/or other non-$CO_2$. |
| 35 | '35' may comprise a compression and/or treatment step and/or liquification step. '35' may comprise a compression and/or water or other solvent vapor removal step and/or residual acid gas or $SO_2$ removal step and/or gas cooling step and/or gas heating step and/or gas liquification step and/or gas processing step. '37' may involve producing a supercritical fluid. |
| 36 | '36' may comprise a fluid stream being transferred to undergo further treatment, compression or use. '36' may comprise $CO_2$. |
| 37 | '37' may comprise a compression and/or treatment and/or liquification step. '37' may comprise a compression and/or water or other solvent vapor removal step and/or residual acid gas or $SO_2$ removal step and/or gas cooling step and/or gas heating step and/or gas liquification step and/or gas processing step. '37' may involve producing a supercritical fluid. |
| 38 | '38' may comprise captured $CO_2$ under suitable conditions or at a suitable phase for, for example, transport, use, utilization, conversion, or storage. |

Example FIG. 2 and FIG. 3 Key

| # | Process Element Descriptions |
|---|---|
| 1 | Pre-Cooled $SO_2$-Rich Flue Gas after Particulate Removal - '1' may comprise pre-cooled $SO_2$-Rich flue gas with at least a portion or most of the particulates removed. '1' may undergo additional cooling or treatment before entering the $SO_2$ absorption column or absorption step, '2'. '1' may undergo compression or pressurization before or while entering the absorption column or absorption step, '2'. |
| 2 | $SO_2$ Absorption Column - '2' may comprise an absorption column or contactor which facilitates the absorption of $SO_2$ from $SO_2$-Rich Flue Gas ('1') into an $SO_2$-Lean solution ('30'), forming an $SO_2$-rich solution ('6') and a $SO_2$-Lean Flue Gas Stream ('3'). It may be desirable for '2' to selectively absorb $SO_2$, while minimally absorbing $CO_2$. Water or solvent scrubbing may be employed to selectively absorb $SO_2$, while, for example, minimally absorbing $CO_2$ due to the significantly greater solubility of $SO_2$ in water or other solvent than $CO_2$. |
| 3 | $SO_2$-Lean Flue Gas after $SO_2$ Absorption - '3' may comprise $SO_2$-Lean flue gas following the absorption of $SO_2$ in '2'. '3' may undergo additional treatment before exiting the process, '4'. |
| 4 | $SO_2$ Scrubbing and/or Other Further Treatment - '4' may comprise a $SO_2$ scrubbing step to remove most of or practically all the remaining or residual $SO_2$ in '3', which may result in an $SO_2$ ultra-lean flue gas stream, '5'. '4' may involve a scrubbing process which selectively absorbs dilute concentrations of $SO_2$, while minimally absorbing $CO_2$. For example, the absorption solution may comprise a bicarbonate, or carbonate, or carbamate, or combination thereof salt or a mixture of salts. For example, the absorbent and/or adsorbent may comprise one or more absorbents and/or adsorbents known in the art for removing $SO_2$ and/or other acid gases from flue gas streams or gas streams. '4' may comprise a regenerable scrubbing process, which may involve recovering or capturing $SO_2$ and/or other acid gases for recycle within the process or for other use. '4' may comprise a non-regenerable scrubbing process, which may involve production and disposal of, for example, salts or chemicals comprising or deriving from $SO_2$. |
| 5 | $SO_2$ ultra-lean flue gas stream. '5' may be vented. '5' may undergo additional treatment. '5' may undergo, for example, flue gas $CO_2$ capture. Although flue gas $CO_2$ capture is feasible, in the present invention, the total $CO_2$ in flue gas emissions may be substantially lower than the total $CO_2$ captured in other process steps (for example, the captured $CO_2$ in '23'). |
| 6 | '6' may comprise an acid gas rich or sulfur dioxide rich water or solution. '6' may comprise a sulfur dioxide rich solution resulting from the absorption of sulfur dioxide into water in an absorption column or gas-liquid contactor. '6' may comprise an acid gas rich solution. |
| 7 | '7' may comprise a multidirectional valve. '7' may direct the flow of the sulfur dioxide rich solution, '6', to the appropriate reactor. The sulfur dioxide rich solution may be directed to an appropriate reactor which may be at a stage in the batch or semi-batch sequence which involves the addition of sulfur dioxide rich solution. The appropriate reactor may change depending on the batch or semi-batch reaction stages and reaction sequence and each reactor's stage in the sequence. |
| 8 | '8' may comprise sulfur dioxide rich solution directed to the first reactor. |
| 9 | '9' may comprise a valve or redundant valve or a flow control valve or a pressure control valve or a pump or a combination thereof. |
| 10 | '10' may comprise sulfur dioxide rich solution directed to the first reactor. |
| 11 | '11' may comprise an input of a $CO_2$ containing salt or a salt comprising $CO_2$. For example, '11' may comprise calcium carbonate input. |
| 12 | '12' may comprise a multidirectional solid transfer valve or solid flow control or solid flow director. '12' may direct the flow of the carbon dioxide salt, such as calcium carbonate, to the appropriate reactor. The carbon dioxide salt, such as calcium carbonate, may be directed to an appropriate reactor which is at a stage in the batch or semi-batch sequence which involves the addition of carbon dioxide salt. The appropriate reactor may change depending on the batch or semi-batch reaction stages and reaction sequence and each reactor's stage in the sequence. |
| 13 | '13' may comprise carbon dioxide salt directed to the first reactor. |
| 14 | '14' may comprise a valve or redundant valve or a flow control valve or a pressure control valve or a pump or a conveyer belt or a combination thereof. |
| 15 | '15' may comprise carbon dioxide salt directed to the first reactor. |
| 16 | '16' may comprise a reactor or mixing apparatus. '16' may be employed to react a salt comprising $CO_2$, such as calcium carbonate, with a recoverable acid gas or a solution comprising a recoverable acid gas, such as aqueous sulfur dioxide. '16' may involve the generation of high partial pressure 'captured' carbon dioxide, which may be generated during a reaction of a salt comprising $CO_2$, such as calcium carbonate, with a recoverable acid gas or a solution comprising a recoverable acid gas, such as aqueous sulfur dioxide. The headspace of '16' may comprise $CO_2$. It may be desirable for the headspace of '16' to contain a high concentration of $CO_2$ or comprise almost entirely $CO_2$ and/or water vapor and/or physical solvent vapor and/or acid gas vapor pressure to, for example, minimize downstream processing of captured $CO_2$. '16' may operate in a semi-batch, or batch or combination thereof configuration. |
| 17 | '17' may comprise a gas stream exiting a reactor or mixer, '16'. '17' may comprise relatively high-pressure $CO_2$ or a gas stream comprising $CO_2$. If desirable, '17' may exit '16' at a relatively standard temperature and with a relatively low partial pressure of water vapor and/or other non-$CO_2$. |

Example FIG. 2 and FIG. 3 Key

| # | Process Element Descriptions |
|---|---|
| 18 | '18' may comprise a multidirectional valve. '18' may direct a gas stream comprising $CO_2$ from one or more reactors to $CO_2$ processing, treatment, compression, transportation, utilization, and/or conversion steps. '18' may control the flow of gas streams or gas streams comprising $CO_2$, including, for example, ensuring gas streams achieve the appropriate specifications or the reactor is at the appropriate stage or a ombination thereof before or while directing one or more gas streams comprising $CO_2$. |
| 19 | '19' may comprise a gas stream comprising $CO_2$ directed by '18' to one or more or a combination of $CO_2$ processing, treatment, compression, transportation, utilization, and/or conversion steps. |
| 20 | '20' may comprise a compression and/or treatment step and/or liquification step. '20' may comprise a compression and/or water or solvent removal step and/or residual acid gas or $SO_2$ removal step and/or gas cooling step and/or gas heating step and/or gas liquification step and/or gas processing step. '20' may involve producing a supercritical fluid. |
| 21 | '21' may comprise a fluid stream being transferred to undergo further treatment, compression or use. '21' may comprise $CO_2$. |
| 22 | '22' may comprise a compression and/or treatment and/or liquification step. '22' may comprise a compression and/or water or solvent removal step and/or residual acid gas or $SO_2$ removal step and/or cooling step and/or heating step and/or liquification step and/or processing step. '22' may involve producing a supercritical fluid. |
| 23 | '23' may comprise captured $CO_2$ under suitable conditions or at a suitable phase for, for example. transport, use, utilization, conversion, or storage. |
| 24 | '24' may comprise a mixture of acid-gas rich salt and a fluid. For example, '22' may comprise a mixture of solid calcium sulfite and water and/or physical solvent, which may comprise a solid-liquid mixture. '24' may comprise some reagents which have not reached full yield or may be designed to be in excess or stoichiometric excess. For example, '24' may comprise a portion calcium carbonate and/or sulfur dioxide and/or sulfur dioxide solution. |
| 25 | '25' may comprise a fluid - solid separation device. For example, '25' may comprise a liquid-solid separation device or a gas-solid separation device or a liquid-gas separation device or a combination thereof. For example, '25' may comprise, including, but not limited to, one or more or a combination of the following: a filter, a rotary filter, a centrifuge, a decanter, or a sedimentation separator. '25' may involve separating solid salts, such as calcium sulfite and calcium carbonate, from water or remaining acid gas solution or acid gas or a combination thereof |
| 26 | '26' may comprise a solution or liquid phase separated following a solid-liquid separation step (for example: '25'). '26' may comprise a lean concentration of acid gas or $SO_2$ solution. '26' may be lean in sulfur dioxide due to the reaction of sulfur dioxide with calcium carbonate. |
| 27 | '27' may comprise a valve or redundant valve or a flow control valve or a pressure control valve or a pump or a combination thereof. |
| 28 | '28' may comprise sulfur dioxide lean or other acid gas lean solution. |
| 29 | '29' may comprise a multidirectional valve. '29' may direct the flow of the sulfur dioxide lean solution to the sulfur dioxide absorption column or contactor, '2'. |
| 30 | '30' may comprise acid gas lean or sulfur dioxide lean water or solution. '30' may be transferred to '2' for absorption or bulk absorption of acid gas or sulfur dioxide. '30' may be cooled before being contacted with acid gases or before entering'2'. Said cooling may involve recovering heat from '30', which may include, but is not limited to, process heating, space heating, or other applications for heat. Said cooling may involve a chiller or chilled water or air cooling or wet surface contact cooling or other cooling methods or a combination thereof or one or more or a combination of processes for cooling. |
| 31 | '31' may comprise separated solid. '31' may comprise separated calcium sulfite or calcium carbonate or a combination thereof |
| 32 | '32' may comprise a valve or redundant valve or a flow control valve or a pressure control valve or a pump or a conveyer belt or a combination thereof. |
| 33 | '33' may comprise separated solid. '33' may comprise separated calcium sulfite or calcium carbonate or a combination thereof. |
| 34 | '34' may comprise a multidirectional solid transfer valve or solid flow control or solid flow director. '34' may direct the flow of the separated acid gas salt or regenerable acid gas salt, such as calcium sulfite, subsequent treatment steps and/or thermal decomposition or calcination step. |
| 35 | '35' may comprise separated solid. '35' may comprise separated calcium sulfite or calcium carbonate or a combination thereof. '35' may be transferred to one or more steps involving pre-treatment, pre-heating, or calcination or thermal decomposition. For example, '35' may undergo drying or further drying before or during or after entering '79'. It may be desirable for said drying, if any, to involve minimal or no contact with diatomic oxygen to, for example, prevent the oxidation of sulfite to sulfate. For example, said drying may comprise, including, but not limited to, one or more or a combination of the following: desiccants, or dry carrier gas, or warm carrier gas, or heated carrier gas, or centrifugation, or heating. |

Example FIG. 2 and FIG. 3 Key

| # | Process Element Descriptions |
|---|---|
| 36 | '36' may comprise sulfur dioxide rich solution directed to the second reactor. |
| 37 | '37' may comprise a valve or redundant valve or a flow control valve or a pressure control valve or a pump or a combination thereof. |
| 38 | '38' may comprise sulfur dioxide rich solution directed to the second reactor. |
| 39 | '39' may comprise a reactor or mixing apparatus. '39' may be employed to react a salt comprising $CO_2$, such as calcium carbonate, with a recoverable acid gas or a solution comprising a recoverable acid gas, such as aqueous sulfur dioxide or sulfur dioxide dissolved in a physical solvent. '39' may involve the generation of high partial pressure 'captured' carbon dioxide, which may be generated during a reaction of a salt comprising $CO_2$, such as calcium carbonate, with a recoverable acid gas or a solution comprising a recoverable acid gas. The headspace of '39' may comprise $CO_2$. It may be desirable for the headspace of '39' to contain a high concentration of $CO_2$ or comprise almost entirely $CO_2$ and/or water vapor or solvent vapor and/or acid gas vapor pressure to, for example, minimize downstream processing of captured $CO_2$. '39' may operate in a semi-batch, or batch or combination thereof configuration. |
| 40 | '40' may comprise carbon dioxide salt directed to the second reactor. |
| 41 | '41' may comprise a valve or redundant valve or a flow control valve or a pressure control valve or a pump or a conveyer belt or a combination thereof. |
| 42 | '42' may comprise carbon dioxide salt directed to the third reactor. |
| 43 | '43' may comprise a gas stream exiting a reactor or mixer, '39'. '43' may comprise relatively high-pressure $CO_2$ or a gas stream comprising $CO_2$. If desirable, '43' may exit '39' at a relatively standard temperature and with a relatively low partial pressure of water vapor and/or other non-$CO_2$ contaminants. |
| 44 | '44' may comprise a mixture of acid-gas rich salt and a fluid. For example, '44' may comprise a mixture of solid calcium sulfite and water, which may comprise a solid-liquid mixture. '44' may comprise some reagents which have not reached full yield or may be designed to be in excess or stoichiometric excess. For example, '44' may comprise a portion calcium carbonate and/or sulfur dioxide and/or sulfur dioxide solution. |
| 45 | '45' may comprise a fluid-solid separation device. For example, '45' may comprise a liquid-solid separation device or a gas-solid separation device or a liquid-gas separation device or a combination thereof. For example, '45' may comprise, including, but not limited to, one or more or a combination of the following: a filter, a rotary filter, a centrifuge, a decanter, or a sedimentation separator. '45' may involve separating solid salts, such as calcium sulfite and calcium carbonate, from water or solvent or remaining acid gas solution or acid gas or a combination thereof |
| 46 | '46' may comprise a solution or liquid phase separated following a solid-liquid separation step (for example: '45'). '46' may comprise a lean concentration of acid gas or aqueous $SO_2$ or $SO_2$ solution. '46' may be lean in sulfur dioxide due to the reaction of sulfur dioxide with calcium carbonate. |
| 47 | '47' may comprise a valve or redundant valve or a flow control valve or a pressure control valve or a pump or a combination thereof. |
| 48 | '48' may comprise sulfur dioxide lean or other acid gas lean solution. |
| 49 | '49' may comprise separated solid. '49' may comprise separated calcium sulfite or calcium carbonate or a combination thereof |
| 50 | '50' may comprise a valve or redundant valve or a flow control valve or a pressure control valve or a pump or a conveyer belt or a combination thereof. |
| 51 | '51' may comprise separated solid. '51' may comprise separated calcium sulfite or calcium carbonate or a combination thereof. |
| 52 | '52' may comprise sulfur dioxide rich solution directed to the third reactor. |
| 53 | '53' may comprise a valve or redundant valve or a flow control valve or a pressure control valve or a pump or a combination thereof. |
| 54 | '54' may comprise sulfur dioxide rich solution directed to the third reactor. |
| 55 | '55' may comprise a reactor or mixing apparatus. '55' may be employed to react a salt comprising $CO_2$, such as calcium carbonate, with a recoverable acid gas or a solution comprising a recoverable acid gas. '55' may involve the generation of high partial pressure 'captured' carbon dioxide, which may be generated during a reaction of a salt comprising $CO_2$, such as calcium carbonate, with a recoverable acid gas or a solution comprising a recoverable acid gas. The headspace of '55' may comprise $CO_2$. It may be desirable for the headspace of '55' to contain a high concentration of $CO_2$ or comprise almost entirely $CO_2$ and/or water vapor or solvent vapor and/or acid gas vapor pressure to, for example, minimize downstream processing of captured $CO_2$. '55' may operate in a semi-batch, or batch or combination thereof configuration. |
| 56 | '40' may comprise carbon dioxide salt directed to the third reactor. |
| 57 | '41' may comprise a valve or redundant valve or a flow control valve or a pressure control valve or a pump or a conveyer belt or a combination thereof. |
| 58 | '42' may comprise carbon dioxide salt directed to the third reactor. |
| 59 | '59' may comprise a gas stream exiting a reactor or mixer, '55'. '59' may comprise relatively high-pressure $CO_2$ or a gas stream comprising $CO_2$. If desirable, '59' may exit '55' at a relatively standard temperature and with a relatively low partial pressure of water vapor and/or solvent vapor and/or other non-$CO_2$. |
| 60 | '60' may comprise a mixture of acid-gas rich salt and a fluid. For example, '60' may comprise a mixture of solid calcium sulfite and water or solvent, which may comprise |

| # | Process Element Descriptions |
|---|---|
| | a solid-liquid mixture. '60' may comprise some reagents which have not reached full yield or may be designed to be in excess or stoichiometric excess. For example, '60' may comprise a portion calcium carbonate and/or sulfur dioxide and/or sulfur dioxide solution. |
| 61 | '61' may comprise a fluid-solid separation device. For example, '61' may comprise a liquid-solid separation device or a gas-solid separation device or a liquid-gas separation device or a combination thereof. For example, '61' may comprise, including, but not limited to, one or more or a combination of the following: a filter, a rotary filter, a centrifuge, a decanter, or a sedimentation separator. '61' may involve separating solid salts, such as calcium sulfite and calcium carbonate, from water or solvent or remaining acid gas solution or acid gas or a combination thereof |
| 62 | '62' may comprise a solution or liquid phase separated following a solid-liquid separation step (for example: '61'). '62' may comprise a lean concentration of acid gas or dissolved $SO_2$. '62' may be lean in sulfur dioxide due to the reaction of aqueous sulfur dioxide with calcium carbonate. |
| 63 | '63' may comprise a valve or redundant valve or a flow control valve or a pressure control valve or a pump or a combination thereof. |
| 64 | '64' may comprise sulfur dioxide lean or other acid gas lean solution. |
| 65 | '65' may comprise separated solid. '65' may comprise separated calcium sulfite or calcium carbonate or a combination thereof |
| 66 | '66' may comprise a valve or redundant valve or a flow control valve or a pressure control valve or a pump or a conveyer belt or a combination thereof. |
| 67 | '67' may comprise separated solid. '67' may comprise separated calcium sulfite or calcium carbonate or a combination thereof. |
| 68 | Air Input - Air or other gas comprising at least a portion oxygen. |
| 69 | Gas Blower or Air Blower or Other Air Pump - Pump or Fan or Blower to pressurize or transfer or a combination thereof air or other gas comprising at least a portion oxygen into the system. |
| 70 | Air Post '69' - Air or other gas comprising at least a portion oxygen after the gas blower. The temperature of '70' may be similar to the temperature of the air source or the surrounding outside air temperature. The temperature of '70' may be less than the temperature of '72'. |
| 71 | Heat Exchanger or Contact Heat Exchanger or Lime Cooler - '70', which may comprise air, may be heat exchanged with hot CaO or cement ('83'), which may result in pre-heated air and cooled CaO or cement. '70' may be directly contacted with the CaO or cement, cooling the CaO or cement, while heating the air. If the air or other oxygen containing gas is in direct contact with CaO or cement, it may be desirable to prevent the air or other oxygen containing gas from entering '77' or other environment potentially containing sulfur oxides or recoverable sulfur oxides to prevent, for example, oxidation of $SO_2$ and/or sulfite into $SO_3$ and/or sulfate during, for example, thermal decomposition steps. Alternatively, or additionally, '70' may be indirectly contacted or heat exchanged with the CaO or cement, cooling the CaO or cement, while heating the air. |
| 72 | Pre-Heated Air - Air which may have been preheated by in '71'. '72' may comprise air fed into the combustion or fuel burning process. |
| 73 | Carbonaceous Fuel Input - A fuel comprising carbon ('73') may be fed or injected into a fuel firing or combustion step ('75'). Carbonaceous fuel may include, but is not limited to, natural gas, coal, pulverized coal, biomass, charcoal, oil, diesel, gasoline, kerosene, LPG, ethane, propane, butane, or a combination thereof. In some embodiments, it may be desirable to burn the carbonaceous fuel ('73') and/or sulfurous fuel ('74') at a ratio with oxygen such that minimal non-reacted oxygen or diatomic oxygen is present in post combustion gases (post-combustion gases may include, but are not limited to, '76'). |
| 74 | Sulfurous Fuel Input - A fuel comprising sulfur ('74') may be fed or injected into a fuel firing or combustion step ('75'). Sulfurous fuel may include, but is not limited to, sulfur, elemental sulfur, sour gas, hydrogen sulfide, sulfur dioxide, sulfur monoxide, ammonium sulfate, ammonium sulfite, or a combination thereof. In some embodiments, it may be desirable to burn the sulfurous fuel ('74') and/or carbonaceous ('73') at a ratio with oxygen such that minimal non-reacted oxygen or diatomic oxygen is present in post combustion gases (for example - '76'). Sulfurous fuel may be employed to reduce the concentration of oxygen in the combustion gases. Sulfurous fuel may be employed to reduce the concentration of oxygen in the combustion gases instead of rich carbonaceous fuel - air ratios, preventing or minimizing incomplete combustion and/or the formation of carbon monoxide. Sulfurous fuel may be employed to as a make-up for sulfur dioxide losses. Alternatively, or additionally, a nitrogenous fuel, such as ammonia or an ammonia salt or an ammonia derivative, may be employed introduced or combusted in '74'. |
| 75 | Combustion chamber or Firing Fan - A chamber or step for combusting fuel to generate high temperature gases for the calcination or thermal decomposition process. '75' may be designed or optimized to minimize the concentration of oxygen in the combustion gases exiting '75' and/or optimize combustion efficiency. |
| 76 | Input Hot Combustion Gases, $SO_2$-Lean - '76' may comprise the hot combustion gases exiting '75' and entering the calcination step or kiln or rotating kiln '77'. Although '76' may contain sulfurous gases, such as sulfur dioxide, the concentration of the sulfurous gases in '76' may desirably be lower than the concentration of |

| # | Process Element Descriptions |
|---|---|
| | sulfurous gases in the gases exiting the kiln, '78'. '76' may possess minimal or ultra-low concentrations of diatomic oxygen to prevent or minimize the formation of sulfates and other practically permanent sulfur compounds or salts or further oxidized sulfur compounds. |
| 77 | Calcination Step or Kiln or Rotating Kiln - '77' may comprise a kiln for the thermal decomposition of acid gas salts into 'acid-gas' and oxide salt or cement. For example, '77' may comprise a kiln which may be employed in the present invention for the thermal decomposition of calcium sulfite into sulfur dioxide and calcium oxide or cement. '77' may comprise a rotating kiln or other kiln. Applicable kilns may include, but are not limited to, kilns employed in the art for the calcination of limestone, or calcination of calcium carbonate, or the production of cement, or a combination thereof. Calcium sulfite may be fed into the kiln and thermally decomposed into at least a portion of sulfur dioxide and calcium oxide or cement using heat from, for example, hot combustion gases, '76', which may be directly passed through or over or in direct contact with said calcium sulfite. Warm calcium oxide or cement, '83', and $SO_2$-Rich flue gases or combustion gases, '78', may comprise outputs of '77'. |
| 78 | Hot Flue Gases, $SO_2$-Rich - '78' may comprise the hot flue gases exiting the kiln, '77'. '78' may comprise a relatively high concentration of $SO_2$ due to, for example, the thermal decomposition or calcination of calcium sulfite in the kiln, '77', and/or $SO_2$ present in the Input Hot Combustion Gases, '76'. At least a portion or all of said '$SO_2$', may be recovered, recycled internally, and/or removed from the gases in '78' in subsequent steps, which may be before at least a portion of the gases in '78' exit the process or are vented. '78' may also comprise particulates which may require separation or removal from the gas stream in subsequent steps. |
| 79 | Heat Exchanger or Contact Heat Exchanger or Calcium Sulfite Pre-Heater - '78', which may comprise $SO_2$-Rich hot flue gases, may be heat exchanged with cold calcium sulfite ('35'), which may result in pre-cooled $SO_2$-Rich flue gases, '80', and pre-heated $CaSO_3$, '82'. $SO_2$-Rich hot flue gases may be directly contacted with the $CaSO_3$. The $SO_2$-Rich hot flue gases may be directly contacted with the $CaSO_3$, for example, because the $SO_2$-Rich hot flue gases may possess an ultra-low concentration of diatomic oxygen, which may prevent the $CaSO_3$ from oxidizing into a sulfate and/or may facilitate the heating and/or decomposition of $CaSO_3$. |
| 80 | Pre-Cooled $SO_2$-Rich Flue Gas - '80' may comprise pre-cooled $SO_2$-Rich flue gas, which may possess particulates which may need to be, at least in part, removed before the $SO_2$ absorption column, '2'. '80' may undergo additional cooling before or during '81'. An additional gas blower or compressor may be required to transfer '80', which may not be shown in a figure. |
| 81 | Particulate Remover or Baghouse or Electrostatic Precipitator, or Filter, or a combination thereof - '81'may comprise one or more or a combination of steps to remove particulate matter from '80'. |
| 82 | '82' may comprise pre-heated solid salt, which may comprise at least a portion a salt comprising acid gas. For example, '82' may comprise a pre-heated solid comprising calcium sulfite. '82' may comprise pre-heated solid undergoing transferring to a calcination or thermal decomposition or cement production reaction or oxide salt formation reaction or gas formation reaction or a combination thereof step. |
| 83 | '83' may comprise a calcined product. For example, '83' may comprise calcium oxide, or Portland cement, or cement or magnesium oxide or a combination thereof. '83' may be warm due to exiting a thermal decomposition or calcination process. '83' may be lean or contain a substantially lower concentration of sulfur dioxide or acid gas or recoverable acid or carbon dioxide or a combination thereof than '83'. '83' may contain residual sulfite or sulfate or other sulfur or acid gas or may contain residual carbon dioxide salts or a combination thereof. |
| 84 | '84' may comprise cooled calcined product. '84' may exit the process and may be sold or otherwise utilized. '84' may undergo further treatment if desired. Alternatively, or additionally, '84' may be employed to absorb $CO_2$ from the air or water or other gas or liquid stream comprising at least a portion $CO_2$ or acid gas. For example, '84' may be employed to capture $CO_2$ if, for example, the present invention comprises at least a portion of a $CO_2$ air capture system. |

ADDITIONAL GENERAL DESCRIPTION

One or more or a combination of steps in the present invention may be conducted in same location or region if desired.

One or more or a combination of steps in the present invention may be conducted in separate locations if desired. For example, a captured carbon dioxide production step, which may comprise a reaction of calcium carbonate with sulfur dioxide to produce calcium sulfite and carbon dioxide, may be conducted in a separate location from the calcining step, which may comprise calcining calcium sulfite into calcium oxide and/or cement and sulfur dioxide. For example, a captured carbon dioxide production step may be conducted in or near a location or application requiring or consuming carbon dioxide, which may include, but is not limited to, one or more or a combination of the following: carbon dioxide enhanced oil recovery, carbon dioxide sequestration, carbon dioxide conversion into materials or chemicals, agriculture, carbon dioxide enhanced greenhouse, or carbon dioxide utilization. For example, the captured carbon dioxide production step may be conducted in or near a location with calcium carbonate or limestone feedstock. For example, the captured carbon dioxide production step may be conducted in or near a system which absorbs carbon dioxide from one or more sources of carbon dioxide, which may include, but is not limited to, air, and may absorb and/or convert said carbon dioxide into calcium carbonate. For example, the calcining step may be conducted in a location with access to a relatively inexpensive fuel, such as flare gas, sour gas, natural gas, or sulfurous fuels, or coal, or biomass, or biofuel, or hydrogen, or nuclear, or geothermal, or waste heat, or heat, or a combination thereof. For example, the calcining step may be conducted in a location with or near demand for the calcined products, which may include, but are not limited to, calcium oxide, calcium hydroxide, magnesium oxide, magnesium hydroxide, cement, sulfur dioxide, nitrogen oxide, or a combination thereof. For example, the acid gas recovery step may be co-located with locations with waste cold. For example, the acid gas recovery step may be co-located with a LNG gasification facility, where, for example, the cooling provided by the phase change of LNG to natural gas may facilitate the separation or recovery of sulfur dioxide or other acid gas.

Example embodiments wherein one or more or a combination of steps are conducted in separate locations may comprise, including, but not limited to:

For example, the carbon dioxide generation step may comprise multiple mixers or reactors, which may each be co-located with one or more or a group of applications consuming or using carbon dioxide. The calcining step and/or acid gas recovery step may be conducted in a centralized location.

For example, the carbon dioxide generation step may comprise multiple mixers or reactors, which may each be co-located with one or more or a group of oil wells requiring carbon dioxide enhanced oil recovery. The calcining step and/or acid gas recovery step may be conducted in a centralized location. Calcium carbonate may be supplied to the carbon dioxide generation step from one or more or a combination of sources, which may include, but is not limited to, mined calcium carbonate, limestone, carbon dioxide air capture, or other calcium carbonate source. Materials may be transferred between process steps. For example, calcium sulfite may be transferred from the carbon dioxide generation step to the calcining step, which may comprise air-tight transport, railcars, trucks, conveyor belt, or ship. For example, recovered sulfur dioxide may be transferred from the acid gas recovery step to the carbon dioxide generation step, which may comprise pipelines, air-tight transport, railcars, tank trucks, trucks, or ship. For example, SO2-rich solution and SO2-lean solution may be transferred between the acid gas recovery step and the carbon dioxide generation step.

If one or more steps are conducted in separate locations, one or more materials may be transferred between said separate locations.

One or more or a combination of steps of the present invention may be modular or transportable or a combination thereof. For example, the carbon dioxide generation step may comprise mobile reactors and/or other mobile or containerized structures. For example, the carbon dioxide generation step may be transported to a location requiring carbon dioxide. For example, if the location requiring carbon dioxide no longer needs carbon dioxide from the carbon dioxide generation step, said carbon dioxide generation step may be transported to a different location. For example, the calcination step and/or acid gas recovery step may comprise mobile calciners, or mobile absorption columns, or mobile separators, or other mobile or containerized structures, or a combination thereof. For example, the calcining step may be transported to locations with significant available low cost energy or an anticipated or temporary release of low cost energy, which may include, but is not limited to, natural gas releases, flare gas, sour gas, forest fire, geothermal events, lava, waste heat, or a combination thereof.

One or more or a combination of materials, reagents, products, inputs, outputs, or intermediates may be sourced, or used, or otherwise employed differently than described herein.

For example, calcium sulfite may comprise a byproduct or salable product, and may comprise an output of the present invention.

For example, sulfur dioxide may comprise a virgin material input, rather than or in addition to a regenerated intermediate.

For example, sulfur dioxide may be converted into elemental sulfur using, for example, the Claus process.

For example, sulfur dioxide may be converted into sulfuric acid.

For example, sulfur dioxide or sulfur or a combination thereof may be transported to the carbon dioxide generation step.

For example, virgin sulfur dioxide or virgin sulfur or virgin hydrogen sulfide or a combination thereof may be transported to the carbon dioxide generation step and/or directly added to the carbon dioxide generation step. Virgin sulfur dioxide may be added to the carbon dioxide generation step or may be dissolved into a solution before said solution is added to the carbon dioxide generation step or a combination thereof. Virgin sulfur or virgin hydrogen sulfide may be combusted to produce virgin sulfur dioxide. Virgin sulfur dioxide may be employed to makeup for sulfur dioxide losses (which may also be referred to as sulfur losses) in the process. Sulfur dioxide losses may include, but are not limited to, sulfur dioxide consumed or absorbed during the calcining step, or residual sulfur dioxide in flue gases following one or more treatment steps, or residual sulfur dioxide in flue gases which may be uneconomical to fully regenerate, or sulfur dioxide converted to one or more other compounds which may not be economically regenerable, sulfur dioxide converted to one or more products, or a combination thereof.

Some embodiments of the present invention may be constructed or implemented by retrofitting a pre-existing calciner for cement production and/or calcium oxide production to operate with input comprising calcium sulfite, rather than, or in addition to, calcium carbonate or limestone.

Some pre-existing calciners comprise materials compatible with CaSO3 and/or SO2 and/or other regenerable acid gas or regenerable acid gas salt. Some pre-existing calciners may require one or more or a combination of components to be replaced or coated to ensure material compatibility with CaSO3 and/or SO2.

Some pre-existing calciners may be retrofitted with systems or materials to ensure lower diatomic oxygen concentration in the calciner or in the input feeder or in the pulverizer or a combination thereof A richer fuel to air ratio may be employed minimize diatomic oxygen concentration or amounts in the calciner. Due to a richer fuel mixture, some embodiments may require systems for removing or eliminating or converting incomplete combustion products (for example: carbon monoxide (CO) and VOCs). Said systems for removing or eliminating incomplete combustion products may include, but are not limited to, systems for further oxidizing the incomplete combustion products, catalytic converters, or systems for creating valuable products or chemicals or fuels from incomplete combustion products.

Some pre-existing calciners may be retrofitted with systems or materials to minimize the amount of air or other gases comprising diatomic oxygen enter the calciner. For example, improved seals and/or improved flow control may be implemented.

The fuel combustion step or system may be modified or replaced to enable combustion of carbonaceous fuel, and/or sulfurous fuel, and/or nitrogenous fuel and/or hydrogen fuel. For example, the fuel combustion system may modified or replaced to enable one or more combustion steps. For example, the fuel combustion step or system may modified or replaced to enable one or more combustion steps, wherein each combustion step may decrease the concentration or amount of diatomic oxygen.

The carbon dioxide generation step, the acid gas recovery step, other process elements, or a combination thereof may be added or installed in a retrofit system.

The present invention may comprise a gas separation technology. For example, the present invention may be employed to regenerate an oxide with affinity for carbon dioxide from carbon dioxide salt. For example, the present invention may be employed to regenerate an oxide with affinity for carbon dioxide from carbon dioxide salt as part of a system for capturing $CO_2$ from air or water or other potentially dilute $CO_2$ stream. For example, the present invention may be employed to regenerate an oxide with affinity for carbon dioxide from a carbon dioxide salt as part of a system for removing carbon dioxide from sodium carbonate or potassium carbonate or other alkali-carbonate. For example, the present invention may be employed to regenerate an alkaline-earth oxide with affinity for carbon dioxide from an alkaline-earth carbonate as part of a system for regenerating an alkali-metal oxide or carbonate from an alkali-metal carbonate, sesquicarbonate, or bicarbonate.

For example, in an example $CO_2$ air capture embodiment:
1. $CO_2$ may be absorbed from air or water into a CO2-Lean alkali solution (for example: a solution comprising lithium or sodium or potassium or ammonia or amine), forming a CO2-Rich alkali solution. Said CO2-Lean alkali solution may comprise an alkali oxide solution. Said CO2-Lean alkali solution may comprise a carbonate solution. Said CO2-Rich alkali solution may comprise a carbonate or sesquicarbonate or bicarbonate solution. Said CO2-Rich alkali solution may comprise a greater concentration of $CO_2$ or greater molar ratio of $CO_2$ to alkali than said CO2-Lean alkali solution.
2. Said CO2-Rich alkali solution may be contacted with a CO2-Lean alkaline-earth solid, which may result in the formation of a CO2-Lean alkali solution and a CO2-Rich alkaline-earth solid. Said CO2-Rich alkaline-earth solid may comprise alkaline-earth carbonate. Said CO2-Lean alkaline-earth solid may comprise alkaline-earth oxide. Said CO2-Rich alkaline-earth solid may comprise a greater concentration of $CO_2$ or greater molar ratio of $CO_2$ to alkali than said CO2-Lean alkaline-earth solid. Said CO2-Lean alkali solution may be transferred to step 1. Said CO2-Rich alkaline-earth solid may be transferred to step 3.
3. Said CO2-Rich alkaline-earth solid may be converted into a CO2-Lean alkaline-earth solid using one or more or a combination of systems or methods described herein. Said CO2-Lean alkaline-earth solid may be transferred to step 2.

The present invention may enable the capture of carbon dioxide from air or water with, including, but not limited to, one or more or a combination of the following:

Reagents comprising an alkali, or an alkaline-earth, or a combination thereof

The generation of captured carbon dioxide comprising a high purity of gaseous carbon dioxide The generation of captured carbon dioxide comprising a low concentration of water vapor or solvent vapor The generation of captured carbon dioxide at a high pressure of carbon dioxide The generation of captured carbon dioxide at mild temperatures The generation of captured carbon dioxide, wherein the regeneration process is separate from the $CO_2$ generation step and may involve the regeneration of an acid gas other than $CO_2$.

Fuel in the process may be combusted in air and/or heat transferred into the thermal regeneration or thermal decomposition step comprises hot combustion gases A $CO_2$ air capture technology involving calcination without the need for an air separation unit or an oxy-combustion unit or a $CO_2$ atmosphere calcination environment The generation of captured carbon dioxide without the need for an air separation unit or an oxy-combustion unit

EXAMPLE EXEMPLARY EMBODIMENTS AND SUB-EMBODIMENTS

Example Exemplary Embodiments:

A process for producing captured carbon dioxide comprising:
Reacting a carbonate salt with a regenerable acid gas to produce a cation-regenerable acid gas salt and gaseous carbon dioxide;
Thermally decomposing said cation-regenerable acid gas salt to produce cement, an oxide, or a combination thereof A process for producing captured carbon dioxide comprising:
Reacting a carbonate salt with a regenerable acid gas to produce a cation-regenerable acid gas salt and gaseous carbon dioxide;
Thermally decomposing said cation-regenerable acid gas salt to produce cement, an oxide, regenerable acid gas, or a combination thereof A process for producing captured carbon dioxide comprising:
Reacting a carbonate salt with sulfur dioxide to produce a sulfite salt and gaseous carbon dioxide;
Thermally decomposing said sulfite salt to produce cement, an oxide, or a combination thereof A process for producing captured carbon dioxide comprising:
Reacting a carbonate salt with sulfur dioxide-rich aqueous solution to produce a sulfite salt, gaseous carbon dioxide, and sulfur dioxide-lean aqueous solution;
Separating said sulfite salt from said sulfur dioxide-lean aqueous solution;
Thermally decomposing said separated sulfite salt to produce cement, an oxide, or a combination thereof A process for producing cement or calcium oxide or CO2-lean alkaline earth carbonate and captured carbon dioxide comprising:
  Reacting solid calcium carbonate with sulfur dioxide-rich aqueous solution to produce calcium sulfite, gaseous carbon dioxide, and sulfur dioxide-lean aqueous solution;
  Separating said solid calcium sulfite from said sulfur dioxide-lean aqueous solution;
  Thermally decomposing said separated calcium sulfite to produce calcium oxide, cement, or a combination thereof A process for producing captured carbon dioxide comprising:
  Reacting solid magnesium carbonate with sulfur dioxide-rich aqueous solution to produce magnesium sulfite, gaseous carbon dioxide, and sulfur dioxide-lean aqueous solution;
  Separating said solid magnesium sulfite from said sulfur dioxide-lean aqueous solution;
  Thermally decomposing said separated magnesium sulfite to produce gaseous sulfur dioxide Example Exemplary Embodiments:

1. A process for producing captured carbon dioxide comprising:
  Reacting solid calcium carbonate with sulfur dioxide-rich solution to produce calcium sulfite, gaseous carbon dioxide, and sulfur dioxide-lean solution;
  Separating said solid calcium sulfite from said sulfur dioxide-lean solution;
  Thermally decomposing said separated calcium sulfite to produce gaseous sulfur dioxide
2. The process of exemplary embodiment 1 wherein said calcium sulfite is thermally decomposed to produce cement
3. The process of exemplary embodiment 1 wherein said calcium sulfite is thermally decomposed to produce calcium oxide
4. The process of exemplary embodiment 1 wherein said calcium sulfite is thermally decomposed in a mixture with calcium carbonate
5. The process of exemplary embodiment 1 wherein said calcium sulfite is thermally decomposed in a mixture comprising clay, or silicon dioxide, or aluminum oxide, or iron oxide, or iron carbonate, or magnesium carbonate, or magnesium oxide, or silicates, or aluminates, or shale, or sand, or fly ash, or ash, or slag, or sulfur oxides, or a combination thereof
6. The process of exemplary embodiment 1 wherein said calcium sulfite is thermally decomposed in a low oxygen environment
7. The process of exemplary embodiment 6 wherein said low oxygen environment comprises a concentration of gaseous diatomic oxygen of less than 20,000 PPM
8. The process of exemplary embodiment 6 wherein said low oxygen environment comprises a concentration of gaseous diatomic oxygen of less than 10,000 PPM
9. The process of exemplary embodiment 1 wherein said thermal decomposition is conducted in the presence of hot gases
10. The process of exemplary embodiment 9 wherein said hot gases comprise combustion gases
11. The process of exemplary embodiment 10 wherein said combustion gases originated from the combustion of a fuel-rich mixture
12. The process of exemplary embodiment 10 wherein said combustion gases originated from the combustion of fuel comprising carbonaceous fuel, sulfurous fuel, nitrogenous fuel, hydrogen fuel, or a combination thereof
13. The process of exemplary embodiment 10 wherein said combustion gases originated from a combustion process comprising a first combustion step and a second combustion step;
  Wherein the first combustion step comprises combusting carbonaceous fuel; and Wherein the second combustion step comprises combusting sulfurous fuel
14. The process of exemplary embodiment 13 wherein the second combustion step reduces the diatomic oxygen concentration
15. The process of exemplary embodiment 13 wherein the second combustion step provides makeup sulfur dioxide to makeup for sulfur dioxide losses in the process
16. The process of exemplary embodiment 10 wherein said combustion gases originated from a combustion process comprising a first combustion step and a second combustion step;
  Wherein the first combustion step comprises combusting carbonaceous fuel; and Wherein the second combustion step comprises combusting hydrogen fuel
17. The process of exemplary embodiment 10 wherein said combustion gases originated from a combustion process comprising a first combustion step and a second combustion step;
  Wherein the first combustion step comprises combusting hydrogen fuel; and
  Wherein the second combustion step comprises combusting sulfurous fuel
18. The process of exemplary embodiment 10 wherein said combustion gases originated from a combustion process comprising a first combustion step and a second combustion step;
  Wherein the first combustion step comprises combusting carbonaceous fuel; and Wherein the second combustion step comprises combusting nitrogenous fuel
19. The process of exemplary embodiment 10 wherein said combustion gases originated from a combustion process comprising a first combustion step and a second combustion step;
  Wherein the first combustion step comprises combusting carbonaceous fuel; and Wherein the second combustion step comprises combusting a sulfurous fuel and a nitrogenous fuel
20. The process of exemplary embodiment 10 wherein said combustion gases originated from a combustion process comprising a first combustion step and a second combustion step;
  Wherein the first combustion step comprises combusting carbonaceous fuel; and Wherein the second combustion step comprises combusting a hydrogen fuel and a sulfurous fuel
21. The process of exemplary embodiment 13 wherein said first combustion step comprises combustion in a diatomic oxygen-rich gas and forming diatomic oxygen-lean gas; and
  Said second combustion step comprises combustion in said diatomic oxygen-lean gas and forming a diatomic oxygen-ultra-lean gas
22. The process of exemplary embodiment 1 wherein the gaseous sulfur dioxide resulting from said thermal decomposition comprises a mixture of post-combustion gases and sulfur dioxide
23. The process of exemplary embodiment 1 further comprising recovering or separating at least a portion of the gaseous sulfur dioxide resulting from said thermal decomposition 24. The process of exemplary embodiment 23 where said recovering or separating comprises absorbing sulfur dioxide in a water wash or physical absorbent wash
25. The process of exemplary embodiment 23 where said recovering or separating comprises condensing sulfur dioxide
26. The process of exemplary embodiment 1 further comprising recovering or separating at least a portion of the gaseous sulfur dioxide resulting from said thermal decomposition by absorption into a sulfur dioxide-lean solution, producing a sulfur dioxide-rich solution
27. The process of exemplary embodiment 23 wherein said sulfur dioxide-rich solution comprises the sulfur dioxide-rich solution reacted with calcium carbonate in claim 1
28. The process of exemplary embodiment 1 wherein said calcium carbonate comprises limestone A process for producing captured or high purity $CO_2$ and/or calcium oxide and/or cement and/or $CO_2$-Lean Alkaline-Earth Carbonate comprising:
1) $SO_2(aq)+CO_2\text{-Salt} \square SO_2\text{-Salt}+CO_2(g)$ or acid gas+ $CO_2\text{-salt} \square$ acid gas–Salt+$CO_2(g)$
2) Regenerating at least portion of the $SO_2$ in said $SO_2$-salt
Wherein at least a portion of the $SO_2$ regenerated in '2)' is employed as the input $SO_2$ in '1)'
Wherein the salt resulting from the regeneration of $SO_2$ ('2') comprises an oxide or oxide salt
Wherein the resulting from the regeneration of $SO_2$ ('2') comprises an oxide or oxide salt and the oxide salt is employed in the production of cement
Wherein the salt resulting from the regeneration of $SO_2$ ('2') comprises cement
Wherein a solid byproduct of '2)' comprises cement
Wherein '2' is conducted in the presence of one or more or a combination of feedstocks employed in the production of Portland Cement
Wherein '2' is conducted in the presence of one or more or a combination of clay, silicates, aluminum oxides, iron oxides, silicon oxides, magnesium oxides, or gypsum, or sulfites, or sulfates
Wherein the salt resulting from the regeneration of $SO_2$ ('2') is employed to absorb carbon dioxide from one or more or a combination of gas streams comprising at least a portion $CO_2$
Wherein said one or more gas streams comprising at least a portion $CO_2$ comprises air
Wherein said one or more gas streams comprising at least a portion $CO_2$ comprises flue gas, biogas, natural gas, . . .
Wherein the salt resulting from the regeneration of $SO_2$ ('2') comprises lime
Wherein the salt resulting from the regeneration of $SO_2$ ('2') comprises quicklime
Wherein the salt resulting from the regeneration of $SO_2$ ('2') is hydrated or mixed with water to produce slacked lime
Wherein the salt resulting from the regeneration of $SO_2$ ('2') comprises a valuable byproduct comprising an oxide salt
Wherein the salt resulting from the regeneration of $SO_2$ ('2') comprises a feedstock for cement
Wherein the $CO_2$-Salt comprises limestone
Wherein the $CO_2$-Salt comprises A process for producing captured or high purity $CO_2$ and calcium oxide comprising:
1) 1) $SO_2(aq)+CO_2\text{-Salt} \rightarrow SO_2\text{-Salt}+CO_2(g)$ or acid gas+$CO_2$-salt$\rightarrow$acid gas–Salt+$CO_2(g)$
2) Regenerating at least portion of the $SO_2$ in said $SO_2$-salt is regenerated
Wherein at least a portion of the $SO_2$ regenerated in '2)' is employed as the input $SO_2$ in '1)'
Wherein the salt resulting from the regeneration of $SO_2$ ('2') comprises an oxide or oxide salt A process for producing calcium oxide comprising:
Thermally decomposing calcium sulfite to produce calcium oxide and sulfur dioxide
Wherein said thermally decomposing is conducted in a low diatomic oxygen environment
Wherein said low diatomic oxygen environment is facilitated by the combustion of at least a portion of sulfur or hydrogen sulfide or a combination thereof A process for producing calcium oxide comprising:
Thermally decomposing calcium sulfite to produce calcium oxide and sulfur dioxide
Wherein said thermally decomposing is conducted in a low oxygen environment
Wherein said low oxygen environment is facilitated by the combustion of at least a portion of sulfur or hydrogen sulfide or a combination thereof
Wherein said low oxygen environment is facilitated by a high concentration of fuel relative to air during combustion, such as a ratio of fuel to air near or equal to or greater than that required by stoichiometry
Wherein said low oxygen environment is facilitated by the use of a recirculating carrier gas Notes
Sulfur dioxide may be provided as an example regenerable acid gas
Increasing Partial Pressure and/or Concentration and/or Volume % Concentration:
Some embodiments may pressurize or compress a gas comprising sulfur dioxide (for example: compressing or pressurizing gas stream represented by '13' or '14' or '15' in FIG. 1) before or during absorption of sulfur dioxide (For example: absorption represented by '16' in FIG. 1). Increasing the pressure of a gas stream comprising sulfur dioxide may increase the partial pressure of sulfur dioxide. Sulfur dioxide may be provides as an example regenerable acid gas.
Some embodiments may increase the concentration and/or partial pressure and/or volume % concentration of sulfur dioxide in a gas mixture (for example: increase the concentration and/or partial pressure and/or volume % concentration of a gas stream represented by '13' or '14' or '15' in FIG. 1) using a gas membrane. Membranes and membrane-based systems for concentrating gases are known in the art and may be employed to increase the concentration of sulfur dioxide in a gas mixture.
Increasing the partial pressure of sulfur dioxide may increase the solubility of sulfur dioxide in an absorption solution. By increasing the solubility of sulfur dioxide, the sulfur dioxide absorption solution may achieve a greater dissolved sulfur dioxide concentration, or the sulfur dioxide absorption column may be smaller, or the sulfur dioxide absorption solution may possess a greater absorption capacity, or the sulfur dioxide absorption system may operate at a lower absorption solution flow rate, or the sulfur dioxide absorption system may operate at a greater absorption efficiency or absorption recovery rate, or a combination thereof. It may be desirable for said pressurization or compression to be conducted after cooling a gas stream comprising sulfur dioxide.

Some embodiments may involve increasing the concentration of dissolved acid gas in the aqueous phase or liquid phase or in a solution. For example, some embodiments may involve increasing the concentration of dissolved acid gas using a membrane-based process. For example, some embodiments may involve increasing the concentration of dissolved acid gas using electrodialysis. For example, some embodiments may involve increasing the concentration of dissolved acid gas using a size-based separation method. For example, some embodiments may involve increasing the concentration of dissolved acid gas using reverse osmosis, forward osmosis, nanofiltration, ultrafiltration, or a combination thereof.

A gas stream comprising sulfur dioxide may be cooled or further cooled or chilled before one or more or a combination of absorption or separation or removal steps.

In FIG. 3, arrows in each figure may indicate the current batch stage in the batch or semi-batch sequence of each reactor. FIG. 3A-3C may show each batch stage in an example batch sequence.

If desired, heat may be recovered from an exothermic enthalpy of reaction during the reaction between calcium carbonate and sulfur dioxide. If desired, energy, such as mechanical energy, may be recovered from the pressure of CO2 generated during, for example, the reaction between calcium carbonate and sulfur dioxide. Alternatively, or additionally, the heat generated may facilitate the reaction or facilitate generation of CO2.

Some embodiments may involve the generation of relatively high partial pressure or purity CO2 during the production of calcium oxide via the displacement of CO2 using an acid gas and the regeneration of said acid gas.

Some embodiments may employ a chemically reactive absorbent in the absorption step, for, for example, capturing carbon dioxide. A chemically reactive absorbent may be beneficial due to, including, but not limited to, one or more or a combination of the following: greater absorption kinetics, greater absorption capacity, or the ability to achieve greater rejection rate with a liquid-phase membrane-based separation process.

Some embodiments may employ physical absorbents as absorbents for absorbing or separating acid gas, such as sulfur dioxide. Said physical absorbents may comprise aqueous or non-aqueous solutions. Said physical absorbents may possess beneficial properties. For example, said beneficial properties may include, but is not limited to, one or more or a combination of the following: greater solubility of sulfur dioxide relative to water, faster absorption kinetics of sulfur dioxide relative to water, faster kinetics relative to water, lower freezing point temperature relative to water, lower vapor pressure relative to water, higher boiling point relative to water, lower viscosity relative to water. Said physical absorbents may comprise aqueous solutions or non-aqueous solutions. Said physical absorbents may comprise physical absorbents employed for acid gas removal known in the art, which may include, but are not limited to, propylene carbonate, ethers of polyethylene glycol, glycol ethers, glycols, or methanol, or a combination thereof.

Some embodiments may employ physical absorbents with beneficial properties as absorbents for absorbing or separating acid gas, such as sulfur dioxide. Some embodiments may employ acid-gas rich solutions of physical absorbents in, for example, the carbon dioxide generating step.

Additional Notes:

Embodiments may be modular or transportable:
Conduct the CO2 production step in a modular fashion—CaSO3 production from CaCO3 may be conducted in a solid-gas or solid-liquid mixing module. The CO2 generated may be employed directly in a nearby oil field or other nearby CO2 demand application. The resulting CaSO3 may be transported in an air-tight/oxygen-free container to a calciner, which may or may not be located nearby. This enables the CO2 generation step to be conducted directly next to the oil field or other CO2 demand application and/or may significantly reduce the need for CO2 pipelines.

Inputs—
CaCO3—transported or mined on site, may be pulverized if desired
SO2—regenerated in the calcining step (calcining step may or may not be located nearby). Makeup SO2 may generated or supplied onsite to make-up for losses of SO2. SO2 may be transported in liquid form by truck or by pipeline or by other means.

Treatment/Transfer Steps—
CO2 separation from residual SO2
Creating an oxygen-free or low oxygen environment for CaSO3 output, especially during transport Outputs—
CaSO3—transported in a practically oxygen-free environment to the calciner, which may or may not be located on site or near the site. Calciner employed to calcine CaSO3 may be similar a calciner typically employed in CaCO3 calcining, or may be a retrofitted calciner which was formerly employed in calcining CaCO3 or calcining cement or may be designed for calcining CaSO3.
CO2—CO2 is produced, which can be employed directly onsite for, for example, enhanced oil recovery or CO2 conversion or CO2 sequestration.

Retrofit Pre-Existing Calciners for CaO Production using CaSO3 Feedstock:
Pre-existing calciners may be compatible with CaSO3 and SO2. If needed, some calciners may require some parts to be retrofitted with coatings or new materials to ensure compatibility with SO2
Richer fuel to air ratio may be employed minimize O2 in gas stream.
This also means a method for removing or eliminating incomplete combustion products (for example: carbon monoxide (CO) and VOCs) may be required. This may include, but are not limited to, methods for further oxidizing the CO, catalytic converters, or methods for creating value from CO.
Alternatively, or additionally, sulfur and/or nitrogen based fuels may be included or added to, for example, minimize oxygen concentration in combustion gases and/or to provide makeup SO2 for SO2 losses.

Water wash or other method to recover SO2 from flue gas stream. Waste heat may also be recovered before, during, or after this step Air Capture Calcium Carbonate—Calcium oxide is a core component of many air capture technologies.

The present invention may be employed to regenerate calcium carbonate into calcium oxide and produce high purity and/or high-pressure CO2. Advantageously, in the present invention, pure CO2 may be generated at a high pressure at room temperature or relatively low pressures.

The present invention may comprise the CaO regeneration step of a CO2 air capture or CO2 capture system, which may include the production of high purity or high pressure CO2.

Generated CO2 may contain residual SO2. SO2 may be recovered or separated by, for example, cooling and/or compression, which may result in the liquification or condensation of the SO2.

Trace concentrations of SO2 may be recovered using a caustic solution which may possess less affinity to react with CO2, for example, which may include, but are not limited to, sodium bicarbonate, sodium sulfite solution (which may convert into bisulfite upon reaction with SO2), calcium carbonate, potassium bicarbonate, bicarbonate salts, carbonate salts, sulfite salts, metabisulfite salts, or a combination thereof.

Using a conventional calciner with a fuel rich environment to prevent or minimize the presence of O2

Using the technique for thermal decomposition in an air-free environment to create pure gaseous SO2

Waste heat

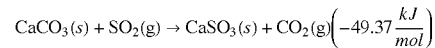
$$CaCO_3(s) + SO_2(g) \rightarrow CaSO_3(s) + CO_2(g)\left(-49.37\frac{kJ}{mol}\right)$$

More general description of CaO production process/CO2 desorption process:

Acid gas is added to CaCO3 to form concentrated/pure/high pressure CO2 and a Calcium-Acid Gas salt. Said Calcium-Acid Gas salt is then decomposed or regenerated. Said decomposition may involve forming Calcium Oxide and Acid Gas. It may be desirable for the acid gas to comprise an acid gas which can more easily be separated or recovered from a gas mixture than CO2 and/or may be thermodynamically favorable to react with CaCO3 to form CO2(g) and Calcium-Acid Gas salt. For example, concentrated SO2 can more easily be separated from a gas stream than concentrated CO2 because it is highly soluble in water.

Use pulverized or highly crushed or high surface area or fine particulate Calcium Carbonate as the input feedstock or conversion into this small particulate calcium carbonate before or during the reaction with SO2

CaCO3, CaSO3, or a combination thereof may also be pulverized or mixed

Because the reaction of CaCO3 and SO2 is exothermic, the reaction may require cooling or heat may be recovered from the reaction.

SO2 may be reacted with CaCO3 as liquid SO2 or as SO2 dissolved in water, or SO2 dissolved in another liquid or as gaseous SO2 or a combination thereof.

If SO2 is dissolved in water or another liquid, it may be desirable for said liquid to have a relatively low concentration of oxygen to prevent the oxidation of SO2 or oxidation of resulting sulfite compounds.

It may be advantageous for SO2 to be dissolved in another liquid, such as water, due to, for example, including, but not limited to, one or more or a combination of the following:

To enhance reaction rate due to SO2 forming acids in solvents (for example: sulfurous acid in water)

Enable a lower SO2 vapor pressure compared to gaseous or liquid SO2, which may enable, for example, including, but not limited to, one or more or a combination of the following:

Reducing concentration and/or amount of SO2 in the desorbed CO2 (from the reaction of SO2 with CaCO3). This may reduce the energy requirements, OPEX, and CAPEX of systems required to separate residual SO2 from the CO2.

Enable higher temperature operation, which may enable, for example, including, but not limited to, one or more or a combination of the following:

Faster reaction kinetics, which generally occurs at higher temperatures

Lower cooling requirements, which may reduce, for example, CAPEX and/or OPEX

Facilitate recovery of heat generated (e.g. waste heat). Water or other liquid solvent may be an effective heat transfer fluid and enable recovery of heat for use in other applications or within the process or may enable more effective cooling Depending on the temperature of the reaction, water or other solvent which SO2 is dissolved in may evaporate or boil. Solvent phase transition may facilitate internal cooling. Additionally, the solvent vapor may facilitate the recovery of SO2 after CO2 desorption. For example, the solvent vapor may be condensed in a condenser, and SO2 may dissolve in said condensed solvent, reducing the SO2 content in the CO2 before further treatment or compression of CO2

Less energy required in recovering the SO2. SO2 may be recovered as an aqueous solution of SO2. The SO2 rich solution after SO2 absorption may be further concentrated. Alternatively, the SO2 rich solution may be reacted with the CaCO3 without further concentrating of the SO2.

Enable near ambient temperature or standard temperature operation, which may be considered higher or elevated temperature relative to the temperature of operation using liquid SO2 at standard pressures SO2 may have a lower vapor pressure in an aqueous solution or other solvent solution than as liquid SO2 at the same temperature.

A process operating at near ambient temperature or standard environment temperature ranges may be cooled using low energy cooling sources, which may include, but are not limited to, one or more or a combination of the following: air cooled (e.g. heat exchanged with ambient air), water cooled, liquid cooled, evaporative water cooling, cooling tower cooling, radiative cooling, or cooling with a refrigeration cycle with a high coefficient of performance Cooling may be facilitated as liquid solution carrying SO2 may be heat exchanged with heat sink and CaCO3 (or calcium containing reaction intermediates or products). This may enable, for example, greater heat transfer, heat transfer to a greater amount calcium salt mass, or smaller vessel or a combination thereof, if compared to cooling using Solid-Solid heat transfer. It is important to note that Solid-Solid heat transfer may be employed if desired.

It may be advantageous for SO2 to be reacted in a relatively pure form, such as liquid SO2, due to, for example, including, but not limited to, one or more or a combination of the following:

Faster reaction kinetics

Potentially higher enthalpy of reaction relative to aqueous SO2

No or minimal water vapor in desorbed CO2

Sub-zero degrees Celsius temperature operation is possible

Lower total liquid volume or mass transfer

Higher pressure desorption

All or almost all SO2 entering reactor may react to form CO2, which may enable, for example, including, but not limited to, one or more or a combination of the following:

Residual SO2 in reactor may be minimal, especially if the CO2 desorption step operates in a batch or semi-batch configuration High pressure CO2 desorbed at a low temperature Desorbed CO2 will not dissolve in water, because there is no liquid water to dissolve in. For comparison, in a process employing water (or other solvent) other than SO2, water or solvent exiting the process may contain dissolved CO2 (especially if CO2 desorbs at a higher pressure or lower temperature), which may result in CO2 losses.

If cooling the reactor is required, cooling may involve heat exchange directly with liquid SO2 or cooling the vessel or reactor using, for example, a liquid cooled or liquid-gas phase transition cooled jacket or direct SO2 refrigerant gas-liquid phase transition.

Sulfur dioxide may be separated from flue gas using condensing or cooling separation or cryogenic separation. For example, flue gas comprising sulfur dioxide may be cooled to at or below a dew point or condensation temperature wherein at least a portion of the sulfur dioxide condenses into a liquid phase.

Reactor may undergo mixing to facilitate, for example, the SO2+CaCO3 reaction.

Process may be configured as batch, semi-batch, or continuous, or a combination thereof.

SO2 losses may occur during operation. SO2 make-up may be accomplished using, including, but not limited to, one or more or a combination of methods.

For example, SO2 may be directly added to the liquid SO2 input source employed in the reaction of SO2 with CaCO3.

For example, elemental sulfur or hydrogen sulfide (for example: hydrogen sulfide in sour natural gas) may be combusted along with carbonaceous fuels. For example, sulfur may be mixed with the coal or other fuel source employed to power the calciner, which may result in the formation of SO2(g). For example, sulfur may be burned as a separate fuel input from carbonaceous fuels, which may involve burning sulfur in a subsequent step. Elemental sulfur may be less expensive and/or easier to transport than SO2. At least a portion of the SO2 generated may be recovered and integrated into the SO2 employed in the process by, for example, the same methods or systems employed to recover the non-virgin SO2. The SO2 generated by this method may mix with the SO2 generated in the calciner, which may enable seamless integration of make-up SO2.

For example, elemental sulfur or hydrogen sulfide may be burned after the burning of the conventional fuel (such as coal or natural gas). This may have multiple benefits:

Reduce the concentration of residual O2 in the flue gas stream produced after the burning of conventional fuels (such as coal or natural gas).

Incomplete combustion of the sulfur fuels may not be as significant or may be less likely as incomplete combustion of carbon-based fuels. Sulfur monoxide (SO) has a positive enthalpy of formation, while carbon monoxide (CO) has a strongly negative enthalpy of formation, so incomplete combustion in a low oxygen environment is much more favorable for a carbon-based fuel than a sulfur-based fuel or elemental sulfur.

Enables the combustion of carbon-based fuels in a sufficiently oxygenated environment, allowing for optimal/efficient combustion, potentially minimizing OPEX and/or CAPEX Low oxygen or ultra-low oxygen concentration in the calciner, preventing oxidation of sulfite salts to sulfate salts Produces SO2, which may comprise a portion or all of the makeup SO2, which may make-up for any SO2 losses during the process Note: SO2 produced during the combustion of sulfurous fuels to remove residual oxygen may exceed the SO2 losses/required makeup SO2. Excess SO2 may be employed in other value creating applications. For example, said other value creating applications may involve, including, but not limited to, one or more or a combination of the following: excess SO2 may be sold or converted into sulfuric acid and sold, or converted into sulfite salts and sold, or reacted with H2S to produce elemental sulfur, or employed in a Claus process.

The conversion of excess SO2 into sulfuric acid, if conducted, is an exothermic process. The heat generated from this reaction may be employed to power or supplement the energy load of other steps in the present invention or other applications demanding heat.

Residual SO2 may be further recovered using a regenerable amine or other regenerable scrubbing process. It may be desirable for said regenerable scrubbing process to minimally react with CO2 or less favorably react with CO2 or not react with CO2, relative to SO2, as CO2 is may be in the gas stream with the SO2. Alternatively or additionally, if the fuels employed to power calcination are not carbon based (for example, may include, but is not limited to, one or more or a combination of the following: Hydrogen sulfide, sulfur, hydrogen, or ammonia), the method employed for scrubbing SO2 may also favorably react with CO2, however, due to the lack of or minimal presence of CO2, the solvent may absorb SO2 with minimal CO2.

Scrubbing systems for recovering residual SO2 may be similar to or the same as methods currently employed at calciners and power plants. For example, for removal of PPT or PPM levels of SO2, a sodium bicarbonate or sodium carbon solution may be employed or calcium carbonate may be employed. If the present invention is retrofitted into a pre-existing calciner, the pre-existing calciner may already have a SO2 scrubber or related emissions control technology.

CaCO3→CaSO3 conversion may not be 100%. Residual CaCO3 may be in the calciner. As a result, it may be desirable to operate the calciner at a temperature equal to or greater than the temperature of typical CaCO3 calcining to ensure complete or nearly complete conversion into CaO Water wash may employ methods to separate ash and/or other potential particulate matter from the wash solution before, during, or after, for example, regenerating SO2.

Sodium sulfite or sodium bisulfite or calcium sulfite or other sulfites or calcium sulfate or sulfates may be byproducts of the process for scrubbing residual SO2

Residual SO2 mixed with desorbed CO2 from, for example, the SO2+CaCO3 reaction, may be recovered using CaCO3 (for example: a fluidized bed of CaCO3), which may react to form CaSO3. Resulting CaSO3 may be used, for example, internally within the present invention.

At least a SO2 in flue gas, which may be residual SO2, may be recovered by reaction with CaCO3, which may result in CaSO3. Said CaSO3 may be calcined to produce CaO.

At least a SO2 in flue gas, which may be residual SO2, may be recovered by reaction with sodium or potassium bicarbonates or carbonates, which may result in sodium or potassium sulfites or bisulfites, or metabisulfites. Said sodium or potassium sulfites or bisulfites, or metabisulfites may be regenerated into sodium or potassium bicarbonates or carbonates by reacting with CaCO3 to produce CaSO3. Said CaSO3 may be calcined to produce CaO.

SO2 recovery method may involve, for example, concentrating SO2 or producing nearly pure SO2 after SO2 absorption Bulk SO2 recovery may involve a water wash. The SO2-rich liquid resulting from the water wash may undergo treatment to remove solids and/or may be employed as the SO2 carrier entering a SO2+CaCO3 reactor. Depending on the reaction kinetics of the SO2-rich solution with the CaCO3, the concentration of SO2 in the SO2-rich solution may be sufficient for the SO2 reaction with CaCO3. Advantageously, employing the SO2-rich solution as the SO2 carrier in the reaction of CaCO3 with SO2 may enable lower CAPEX and OPEX, as it may eliminate the need for the energy consumption (OPEX) and construction (CAPEX) of a SO2 concentrating step. Alternatively, or additionally, a SO2 concentrating step may be employed.

Adsorption CO2 capture process employing aqueous SO2 to desorb CO2

Notes:

Some embodiments thermally decompose CaSO3 using combustion gases with complete combustion acting as, for example, heat source and stripping gas.

Complete combustion, or stoichiometric combustion, or combustion with excess fuel, or combustion with all or almost all oxygen present converted into combustion byproducts, or a combination thereof may enable the combustion gases to be employed directly as heat carriers because the gases may lack oxygen. The lack of oxygen or very low concentrations of oxygen may enable CaSO3 to be decomposed without oxidizing the sulfur species, preventing the formation of SO3(g) or CaSO4.

Combustion gases may be pumped or otherwise forced into contact with the CaSO3 in the one or more CaSO3 decomposition or desorption reactors Combustion gases may be produced by the combustion of carbon-based fuels or fuels without carbon or a combination thereof.

For carbon based fuels, it may be desirable for the reactor temperature during at least one portion of the thermal decomposition to exceed the decomposition temperature of calcium carbonate. This may prevent a reaction of CO2 with calcium oxide or hydroxide, which may prevent the formation of calcium carbonate. This may also enable any residual calcium carbonate in the reactor to be thermally decomposed, which may enable higher conversion efficiency to calcium oxide It may be desirable to employ non-carbon based fuels, which may include, but are not limited to, H2, NH3, H2S, or a combination thereof.

Non-carbon based fuels may be desirable as they may not produce CO2, which may enable the use of lower temperatures during decomposition as there may be no need to inhibit calcium carbonate formation if there is no CO2 present.

For example, H2 may produce steam, which may not react with CaO at the decomposition temperature of CaSO3.

NH3 may produce NO2, which may not react with CaO at the decomposition temperature of CaSO3. Although, NO2 may react with CaO, CaSO3, or CaCO3 at lower temperatures, which may or may not be desirable.

H2S may produce SO2, which is the same gas as the decomposition product of CaSO3. This may be beneficial, as a higher concentration of SO2 may be generated and it may enable a simple composition of the gas stream leaving the decomposition reactor.

Additional Description

The present invention converts CaCO3 into CO2 and CaO. In the process, both CO2 and CaO may be valuable byproducts. The present invention may produce high purity and/or high pressure CO2, which may be suitable for use in enhanced oil recovery and other CO2 utilization or conversion applications. CaO produced by the present invention may be suitable for, for example, including, but not limited to, the production of cement or may comprise quicklime or may be employed to capture CO2 from the air or a combination thereof.

CaO is currently produced by heating CaCO3 or limestone to decompose it into CaO and CO2 in a process called calcining. Calcining is energy intensive and CO2 emission intensive. The process of calcining produces CO2 in the form of flue gas. For CO2 to be useful from calcining, the CO2 must be separated from the flue gas by a post-combustion CO2 capture system, which requires very high capital and operating costs, which generally exceed the value of said CO2. Alternatively, a calciner may be powered by fuel combusted in pure oxygen (oxy-combustion) from an air separation unit. Similar to post-combustion CO2 capture, Oxy-combustion has high capital and operating costs due to the operating costs and capital costs involved with the air separation unit and the significantly higher operating temperature required for decomposing CaCO3 in pure CO2.

The present invention may react SO2 (gas or liquid or aqueous solution or non-aqueous solution or supercritical or solid or a combination thereof) with CaCO3, which may result in the formation of CaSO3 and CO2. The resulting CO2 may undergo further purification to remove at least a portion of SO2 or any other gases present from the CO2. CO2 may be sold or used for one or more applications of high pressure and/or purity CO2. CaSO3 may be thermally decomposed into CaO and SO3. The thermal decomposition of CaSO3 may involve an oxygen free or ultra-low oxygen environment. If a carrier gas is employed, SO3 may be separated from said carrier or stripping gas and may be recovered or regenerated for re-use internally. CaO may be sold or used for one or more applications of CaO. The process may be batch, semi-batch, semi-continuous, continuous, or a combination thereof.

Example Embodiment 1

1. CaCO3 may be placed in a vessel or container. After a desired amount of CaCO3 is dded to said vessel or container, the container may be closed. The container may be evacuated of most or all of the remaining oxygen gas or air by, for example, including, but not limited to, one or more or a combination of methods:
   a. Employing a vacuum pump to evacuate air or O2 from from the container and reduce pressure to near vacuum
   b. Purging with nitrogen or other purge gas
   c. Introducing an amount of CH3, H2, Sulfur, H2S, or NH3 or other combustible or oxygen absorbing reagent and combusting these reagents to remove at least a portion of the O2
   d. Gas separation membrane to separate at least a portion of O2 from the remaining gases
   e. Employing an oxygen scavenger, such as, for example, iron oxides or copper or copper oxides
   f. Condensing a portion of the oxygen or condensing another gas to facilitate the separation of oxygen
2. CaCO3+SO2⇒CaSO3+CO2
3. CaSO3+Heat⇒CaO+SO2

Further Description of Step '2)': SO2 may be injected into the container with CaCO3 as one or more or a combination of phases, although for the purposes of description of the present example embodiment, the SO2 may be injected into container with CaCO3 as SO2 liquid, SO2 aqueous, or SO2 non-aqueous solution or a combination thereof. It may be desirable for said liquid or solution to be de-aerated or contain an ultra-low concentration of oxygen. The SO2 may react with said CaCO3 to form CaSO3 and CO2. If desirable, the container/reactor may be heated or cooled or the temperature may be uncontrolled or the temperature may be controlled or a combination thereof. CO2(g) which may result from the reaction may contain a portion of residual SO2 vapor.

Advantageously, SO2 may be easily separated from CO2 due to its, for example, very different boiling point, or significantly higher solubility in water, or different molar mass, or ability to be removed by a SO2 scavenger, or a combination thereof. Residual SO2 in the CO2 may be separated by, for example, including, but not limited to, one or more or a combination of the following: condensation, cooling condensation, compression condensation, water wash, gas separation membrane, reactive absorption and stripping, or SO2 scrubbing molecule (for example: sodium carbonate, sodium bicarbonate, calcium carbonate, calcium bicarbonate, amine-carbon dioxide, water or ammonium carbonate). The resulting high purity CO2 may be employed in one or more applications for pure CO2, which may include, but are not limited to, enhanced oil recovery, CO2 sequestration, conversion into chemicals, or non-hydraulic cement production. Residual SO2 may be recovered or regenerated and/or reused within the process.

Further Description of Step '3)': CaSO3 may be thermally decomposed. Desirable decomposition byproducts may comprise, for example, CaO and SO2. CaSO3 may be decomposed through heating at or above one or more decomposition temperatures. To maximize the formation of CaO and SO2 and/or minimize the formation of CaS or CaSO4, reaction temperature may be maintained between 600-680° C. or above 780° C. Per paper titled 'The Thermal Decomposition Process of Calcium Sulfite' by Royoko et al, CaSO3 may decompose into CaSO4 and CaS at a temperature between 680° C. and 780° C., and thus, it may be desirable to decompose Calcium Sulfite outside the 680° C.-780° C. temperature range if the objective is to form CaO and SO2.

Thermal input may be supplied by, for example, directly heating the container containing CaSO3 or heating a carrier gas which is passed over or through said CaSO3 or heating SO2 (which may also be employed as a carrier gas) or a combination thereof. The container may comprise one or more solid handling or solids storage containers which may be heated known in the art, which may include, but are not limited to, one or more or a combination of the following: rotary kiln, kiln, column, oven, mixing oven, or a combination thereof.

Carrier gas may comprise a non-reactive gas or a gas which is non-reactive with the reagents present under the conditions present (although may comprise a reactive gas if desired), which may include, but are not limited to, one or more or a combination of the following: nitrogen, argon, helium, fluorinated gases, CFCs, HFCs, or sulfur hexafluoride. If a non-SO2 carrier gas is employed, the SO2-lean carrier gas may be heated before or while entering the container containing CaSO3. SO2 may desorb into said carrier gas (which may also be called a stripping gas), which may form SO2-rich carrier gas and CaSO3 may be converted into CaO. Said SO2-rich carrier gas may exit the container containing CaSO3 or CaO or both. To reduce energy consumption, the SO2-rich carrier gas exiting said container containing CaSO3 or CaO or both may be heat exchanged in, for example, a cross heat exchanger, with incoming SO2-lean carrier gas. Following the cross exchanger, at least a portion of the SO2 in said SO2-rich carrier gas may be separated. SO2 separation may be conducted using one or more methods described herein or one or more methods known in the art, which may include, for example, a water wash or non-aqueous liquid wash or a combination thereof. If a water wash or non-aqueous liquid wash is employed, it may be desirable for the rich solution of SO2 resulting from said water wash or non-aqueous liquid wash or both to comprise the medium for SO2 input for step 2, as, for example, this may eliminate or reduce the energy requirement for recovering SO2 by, for example, preventing the need to steam strip or desorb SO2 from said wash solutions. It may be desirable for the water or non-aqueous medium or both to be oxygen-free or contain low concentrations of oxygen. The remaining SO2-lean carrier gas may be recirculated.

Alternatively, the CaSO3 may be decomposed in a pure or concentrated SO2 environment. A pure SO2 environment may be advantageous because, for example, including, but not limited, one or more or a combination of the following: a) SO2 desorbed may be directly reused, minimizing or eliminating the need for additional processing steps, such water washing; or b) reduce heat exchange losses, as hot SO2 exiting may be directly heat exchanged with any SO2 entering the process or supplement heat input if, for example, no addition SO2 is entering; or c) reduce the total amount of mass requiring heating. A pure SO2 environment may have the disadvantage of potentially higher temperature requirements and/or enthalpy of desorption because the CaSO3 may be decomposed in a pure SO3 environment, which, according to the Le Chatelier Principle, may increase the temperature requirements and/or enthalpy of desorption relative to a lower SO2 concentration environment enabled by a carrier gas.

Advantageously, a non-SO2 carrier gas may be employed, while being able to recover the SO2. SO2, unlike CO2, may be condensable and highly water soluble, enabling separation of SO2 from carrier gas streams, which may be inert gas streams, at a relatively low cost.

Note: The present invention may employ other carbonate or bicarbonate salts as feedstocks, which may include, but are not limited to, sodium and potassium carbonates or bicarbonates.

Note: May employ materials compatible with one or more or a combination of the following: SO2, CO2, or H2O or one or more of the fuels (if any) employed in heating and/or their combustion products. It may be desirable for said materials to be compatible at temperature ranges which the materials will be operating Note: Advantageous, the present invention does not require an air separation unit or post-combustion CO2 capture to produce pure CO2. Also advantageously, pure CO2 may be produced at a high pressure and/or relatively low temperature and/or with relatively low water vapor concentration.

Note: It may be desirable for the CaCO3 or SO2 or CaSO3 or CaO or a combination thereof in an oxygen-free or very low oxygen environment. An oxygen-free or very low oxygen environment may, for example, prevent the oxidation of SO2 or CaSO3 or other SO3 salt into a SO4 salt.

Note: The present invention may be employed to regenerate CaO from CaCO3 or similar carbonate or bicarbonate molecules in a CO2 capture process. For example, the present invention may be employed in a device to capture CO2 from the air.

Note: The SO2 may be substituted with nitric acid (HNO3). Ca(NO3)2 (which may be a resulting byproduct) can be thermally decomposed in a similar manner to CaSO3 to form CaO and NOx or O2 or NO2 or NO or a combination thereof. NOx, NO2, or NO may be converted back into nitric acid through reaction with water in, for example, the NOx+O2 and NOx+H2O reaction steps of the Ostwald process, regenerating the nitric acid in the present embodiment. Advantageously, Ca(NO3)2 does not oxidize in the presence of O2, which may enable the process to operate in an environment with the presence of O2, if desired.

Note: The carrier gas may comprise a reactive gas if desired. For example, steam may be employed as a carrier gas. Advantageously, steam may condense following calcination and the heat generated may be recoverable and the heat generated may exceed initial heat input to generate steam due to, for example, the exothermic dissolution of SO2 in the condensed steam (water) and/or the exothermic reaction of H2O with CaO to produce calcium hydroxide. It is important to note that calcium hydroxide may be a byproduct of this version of the present invention.

Note: Any excess water may be removed from system. Similarly, water may be added to the system if desired. Water removal may be conducted by for example, including, but not limited to, one or more or a combination of the following: forward osmosis, decanter, separatory funnel, coalescer, centrifuge, filter, switchable solvent, cyclone, semi-permeable membrane, nanofiltration, organic solvent nanofiltration, reverse osmosis, ultrafiltration, microfiltration, hot nanofiltration, hot ultrafiltration, distillation, membrane distillation, flash distillation, multi-effect distillation, mechanical vapor compression distillation, or hybrid systems.

Note: Sodium salts may be employed. Sodium Bicarbonate may be decomposed to form Sodium Carbonate, Sodium hydroxide, Sodium Sesquicarbonate, or a combination thereof, or other sodium-carbon dioxide or sodium bicarbonate derivative chemicals.

Note: Separation Devices may include, but are not limited to, one or more or a combination of the following: decanter, separatory funnel, coalescer, centrifuge, filter, switchable solvent, cyclone, semi-permeable membrane, nanofiltration, organic solvent nanofiltration, reverse osmosis, ultrafiltration, microfiltration, hot nanofiltration, hot ultrafiltration, distillation, membrane distillation, flash distillation, multi-effect distillation, mechanical vapor compression distillation, or hybrid systems Note: Heat sources may include, but are not limited to, one or more or a combination of the following: flare gas heat, natural gas combustion, nuclear heat, Waste Heat, Ambient Temperature Changes, Diurnal Temperature Variation, Thermocline liquid body, thermocline solid body, thermocline gaseous body, Thermocline of a water body, halocline, heat pump, solar thermal, solar thermal pond, light, electricity, steam, combustion, compression, pressure increase, geothermal, radiative heat, condensation, exothermic dissolution, exothermic precipitation, exothermic formation of more liquid phases, exothermic formation of less liquid phases, exothermic phase change, or other heat sources described herein.

Note: Systems and methods described herein may be batch, semi-batch, or continuous, or a combination thereof.

Because CaCO3 and CaSO3 may be minimally soluble in water, the aqueous sulfur dioxide may only penetrate surface layers of the CaCO3, meaning some CaCO3 may not undergo the reaction due to a protective layer of the CaSO3. Increasing the reaction yield may be facilitated by, including, but not limited to, reducing CaCO3 particle size and/or maximizing CaCO3 surface area to mass/volume. Increasing the reaction yield may be conducted by adjusting mixing rate and contact time.

Additional Specific Embodiments

1. A process for producing captured carbon dioxide comprising:
   reacting calcium carbonate with sulfur dioxide to produce calcium sulfite and gaseous carbon dioxide; and
   thermally decomposing said calcium sulfite to produce gaseous sulfur dioxide.
2. The process of embodiment 1 wherein said thermal decomposing is conducted under conditions to further produce cement.

3. The process of embodiment 1 wherein said thermal decomposed is conducted under conditions to further produce calcium oxide.
4. The process of embodiment 1 wherein said thermal decomposing is conducted in a mixture with calcium carbonate.
5. The process of embodiment 1 wherein said thermal decomposing is conducted in a mixture comprising a clay, or silicon dioxide, or aluminum oxide, or iron oxide, or iron carbonate, or magnesium carbonate, or magnesium oxide, or a silicate, or an aluminate, or shale, or sand, or fly ash, or ash, or slag, or a sulfur oxide, or a combination thereof.
6. The process of embodiment 1 wherein said thermal decomposing is conducted in a low oxygen environment.
7. The process of embodiment 6 wherein said low oxygen environment comprises a concentration of gaseous diatomic oxygen of less than 20,000 PPM.
8. The process of embodiment 6 wherein said low oxygen environment comprises a concentration of gaseous diatomic oxygen of less than 10,000 PPM.
9. The process of embodiment 1 wherein said thermal decomposing is conducted in the presence of at least one hot gas.
10. The process of embodiment 9 wherein said at least one hot gas comprises a combustion gas.
11. The process of embodiment 10 wherein said combustion gas originated from combustion of a fuel-rich mixture.
12. The process of embodiment 10 wherein said combustion gas originated from combustion of a fuel comprising a carbonaceous fuel, or a sulfurous fuel, or a nitrogenous fuel, or a hydrogen fuel, or a combination thereof.
13. The process of embodiment 10 wherein said combustion gas originated from a combustion process comprising a first combustion step and a second combustion step;
wherein the first combustion step comprises combusting carbonaceous fuel; and wherein the second combustion step comprises combusting sulfurous fuel.
14. The process of embodiment 13 wherein the second combustion step reduces diatomic oxygen concentration.
15. The process of embodiment 13 wherein sulfur dioxide is provided in the second combustion step to makeup for sulfur dioxide loss in the process.
16. The process of embodiment 10 wherein said combustion gas originated from a combustion process comprising a first combustion step and a second combustion step;
wherein the first combustion step comprises combusting carbonaceous fuel; and wherein the second combustion step comprises combusting hydrogen fuel.
17. The process of embodiment 10 wherein said combustion gas originated from a combustion process comprising a first combustion step and a second combustion step;
wherein the first combustion step comprises combusting hydrogen fuel; and
wherein the second combustion step comprises combusting sulfurous fuel
18. The process of embodiment 10 wherein said combustion gas originated from a combustion process comprising a first combustion step and a second combustion step;
wherein the first combustion step comprises combusting carbonaceous fuel; and wherein the second combustion step comprises combusting nitrogenous fuel.
19. The process of embodiment 10 wherein said combustion gas originated from a combustion process comprising a first combustion step and a second combustion step;
wherein the first combustion step comprises combusting carbonaceous fuel; and wherein the second combustion step comprises combusting a mixture comprising a sulfurous fuel and a nitrogenous fuel.
20. The process of embodiment 10 wherein said combustion gas originated from a combustion process comprising a first combustion step and a second combustion step;
wherein the first combustion step comprises combusting carbonaceous fuel; and wherein the second combustion step comprises combusting a mixture comprising a hydrogen fuel and a sulfurous fuel.
21. The process of embodiment 13 wherein said first combustion step comprises combusting the carbonaceous fuel with a diatomic oxygen-rich gas to form a diatomic oxygen-lean gas; and
wherein said second combustion step comprises combusting the sulfurous fuel with the diatomic oxygen-lean gas and to form a diatomic oxygen-ultra-lean gas.
22. The process of embodiment 1 wherein the gaseous sulfur dioxide comprises a mixture of other gases
23. The process of embodiment 1 further comprising recovering at least a portion of the gaseous sulfur dioxide resulting from said thermal decomposing.
24. The process of embodiment 23 where said recovering comprises absorbing sulfur dioxide in a wash.
25. The process of embodiment 23 where said recovering comprises condensing sulfur dioxide.
26. The process of embodiment 1 further comprising recovering at least a portion of the gaseous sulfur dioxide resulting from said thermal decomposing by absorption of said gaseous sulfur dioxide into a sulfur dioxide-lean solution to produce a sulfur dioxide-rich solution.
27. The process of embodiment 1 wherein the sulfur dioxide reacted with the calcium carbonate is in the form of a sulfur dioxide-rich solution and wherein the reaction with the calcium carbonate further produces a sulfur dioxide-lean solution.
28. The process of embodiment 27 which further comprises recovering at least a portion of the gaseous sulfur dioxide resulting from said thermal decomposing by absorption of said gaseous sulfur dioxide into the sulfur dioxide-lean solution to produce a sulfur dioxide-rich solution.
29. The process of embodiment 1 wherein said calcium carbonate comprises limestone.

A process for producing captured carbon dioxide comprising:
reacting a carbonate salt with a regenerable acid gas to produce a cation-regenerable acid gas salt and gaseous carbon dioxide; and
thermally decomposing said cation-regenerable acid gas salt to produce cement, an oxide, or a combination thereof.

A process for producing captured carbon dioxide comprising:
reacting a carbonate salt with sulfur dioxide to produce a sulfite salt and gaseous carbon dioxide; and
thermally decomposing said sulfite salt to produce cement, an oxide, or a combination thereof.

A process for producing captured carbon dioxide comprising:
reacting a carbonate salt with sulfur dioxide-rich solution to produce a sulfite salt, gaseous carbon dioxide, and sulfur dioxide-lean solution;
separating said sulfite salt from said sulfur dioxide-lean solution; and
thermally decomposing said separated sulfite salt to produce cement, an oxide, or a combination thereof.

A process for producing cement or calcium oxide and captured carbon dioxide comprising:

reacting solid calcium carbonate with sulfur dioxide-rich solution to produce calcium sulfite, gaseous carbon dioxide, and sulfur dioxide-lean solution;
separating said solid calcium sulfite from said sulfur dioxide-lean solution; and
thermally decomposing said separated calcium sulfite to produce calcium oxide, cement, or a combination thereof.

A process for producing captured carbon dioxide comprising:
reacting solid magnesium carbonate with sulfur dioxide-rich solution to produce magnesium sulfite, gaseous carbon dioxide, and sulfur dioxide-lean solution;
separating said solid magnesium sulfite from said sulfur dioxide-lean solution; and
thermally decomposing said separated magnesium sulfite to produce gaseous sulfur dioxide.

What is claimed is:

1. A process for producing captured carbon dioxide comprising:
reacting calcium carbonate with sulfur dioxide solution to directly produce solid calcium sulfite and gaseous carbon dioxide without the prior or simultaneous production of bisulfite;
thermally decomposing said calcium sulfite to produce gaseous sulfur dioxide; and
recovering gaseous sulfur dioxide by dissolving it in a solution;
wherein the gaseous carbon dioxide is captured and wherein the reaction of calcium carbonate with sulfur dioxide solution is conducted under conditions to prevent the formation of sulfate salts, wherein said conditions to prevent the formation of sulfate salts in the reaction of calcium carbonate with sulfur dioxide solution comprise gaseous diatomic oxygen concentration of less than 21 vol %.

2. The process of claim 1 wherein said thermal decomposing is conducted in a mixture with calcium carbonate.

3. The process of claim 1 wherein said thermal decomposing is conducted in a mixture comprising a clay, or silicon dioxide, or aluminum oxide, or iron oxide, or iron carbonate, or magnesium carbonate, or magnesium oxide, or a silicate, or an aluminate, or shale, or sand, or fly ash, or ash, or slag, or a sulfur oxide, or a combination thereof.

4. The process of claim 1, wherein said gaseous diatomic oxygen concentration is less than 20,000 PPM.

5. The process of claim 1, wherein said gaseous diatomic oxygen concentration is less than 10,000 PPM.

6. The process of claim 1 wherein the thermal decomposing further produces other gases.

7. The process of claim 1 further comprising recovering at least a portion of the gaseous sulfur dioxide resulting from said thermal decomposing by absorption of said gaseous sulfur dioxide into a sulfur dioxide-lean solution to produce a sulfur dioxide-rich solution.

8. The process of claim 1 wherein said calcium carbonate comprises limestone.

9. The process of claim 1 wherein said thermal decomposing is conducted in the presence of at least one hot gas.

10. The process of claim 9 wherein said at least one hot gas comprises a combustion gas.

11. The process of claim 10 wherein said combustion gas originated from combustion of a fuel-rich mixture comprising a ratio of a fuel to an oxidant which is equal to or greater than a stoichiometric ratio of the fuel to the oxidant for complete combustion.

12. The process of claim 10 wherein said combustion gas originated from combustion of a fuel comprising a carbonaceous fuel, or a sulfurous fuel, or a nitrogenous fuel, or a hydrogen fuel, or a combination thereof.

13. The process of claim 10 wherein said combustion gas originated from a combustion process comprising a first combustion step and a second combustion step;
wherein the first combustion step comprises combusting carbonaceous fuel; and wherein the second combustion step comprises combusting hydrogen fuel.

14. The process of claim 10 wherein said combustion gas originated from a combustion process comprising a first combustion step and a second combustion step;
wherein the first combustion step comprises combusting hydrogen fuel; and
wherein the second combustion step comprises combusting sulfurous fuel.

15. The process of claim 10 wherein said combustion gas originated from a combustion process comprising a first combustion step and a second combustion step;
wherein the first combustion step comprises combusting carbonaceous fuel; and wherein the second combustion step comprises combusting nitrogenous fuel.

16. The process of claim 10 wherein said combustion gas originated from a combustion process comprising a first combustion step and a second combustion step;
wherein the first combustion step comprises combusting carbonaceous fuel; and wherein the second combustion step comprises combusting a mixture comprising a sulfurous fuel and a nitrogenous fuel.

17. The process of claim 10 wherein said combustion gas originated from a combustion process comprising a first combustion step and a second combustion step;
wherein the first combustion step comprises combusting carbonaceous fuel; and wherein the second combustion step comprises combusting a mixture comprising a hydrogen fuel and a sulfurous fuel.

18. The process of claim 10 wherein said combustion gas originated from a combustion process comprising a first combustion step and a second combustion step;
wherein the first combustion step comprises combusting carbonaceous fuel; and wherein the second combustion step comprises combusting sulfurous fuel.

19. The process of claim 18 wherein the second combustion step reduces diatomic oxygen concentration.

20. The process of claim 18 wherein sulfur dioxide is provided in the second combustion step to makeup for sulfur dioxide loss in the process.

21. The process of claim 18 wherein said first combustion step comprises combusting the carbonaceous fuel with a diatomic oxygen-rich gas to form a diatomic oxygen-lean gas; and
wherein said second combustion step comprises combusting the sulfurous fuel with the diatomic oxygen-lean gas and to form a diatomic oxygen-ultra-lean gas.

22. The process of claim 1 further comprising recovering at least a portion of the gaseous sulfur dioxide resulting from said thermal decomposing.

23. The process of claim 22 where said recovering comprises absorbing sulfur dioxide in a wash.

24. The process of claim 22 where said recovering comprises condensing sulfur dioxide.

25. The process of claim 1 wherein the sulfur dioxide reacted with the calcium carbonate is in the form of a sulfur dioxide-rich solution and wherein the reaction with the calcium carbonate further produces a sulfur dioxide-lean solution.

26. The process of claim 25 which further comprises recovering at least a portion of the gaseous sulfur dioxide resulting from said thermal decomposing by absorption of said gaseous sulfur dioxide into the sulfur dioxide-lean solution to produce a sulfur dioxide-rich solution.

* * * * *